Figure 1:
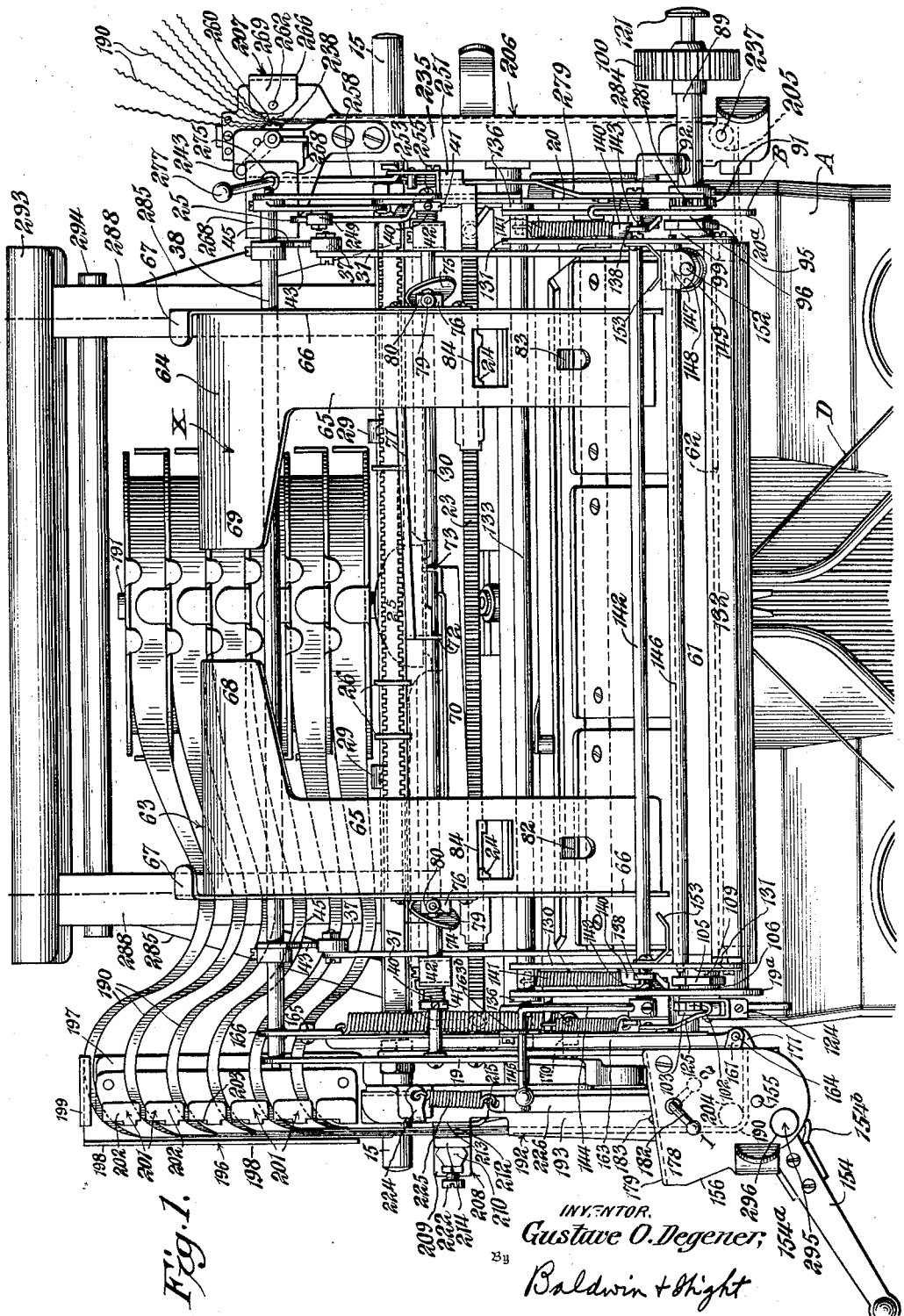

Dec. 13, 1932.   G. O. DEGENER   1,890,563
MANIFOLDING DEVICE
Filed July 30, 1930   12 Sheets-Sheet 1

INVENTOR.
Gustave O. Degener
By Baldwin + Wight
ATTORNEYS.

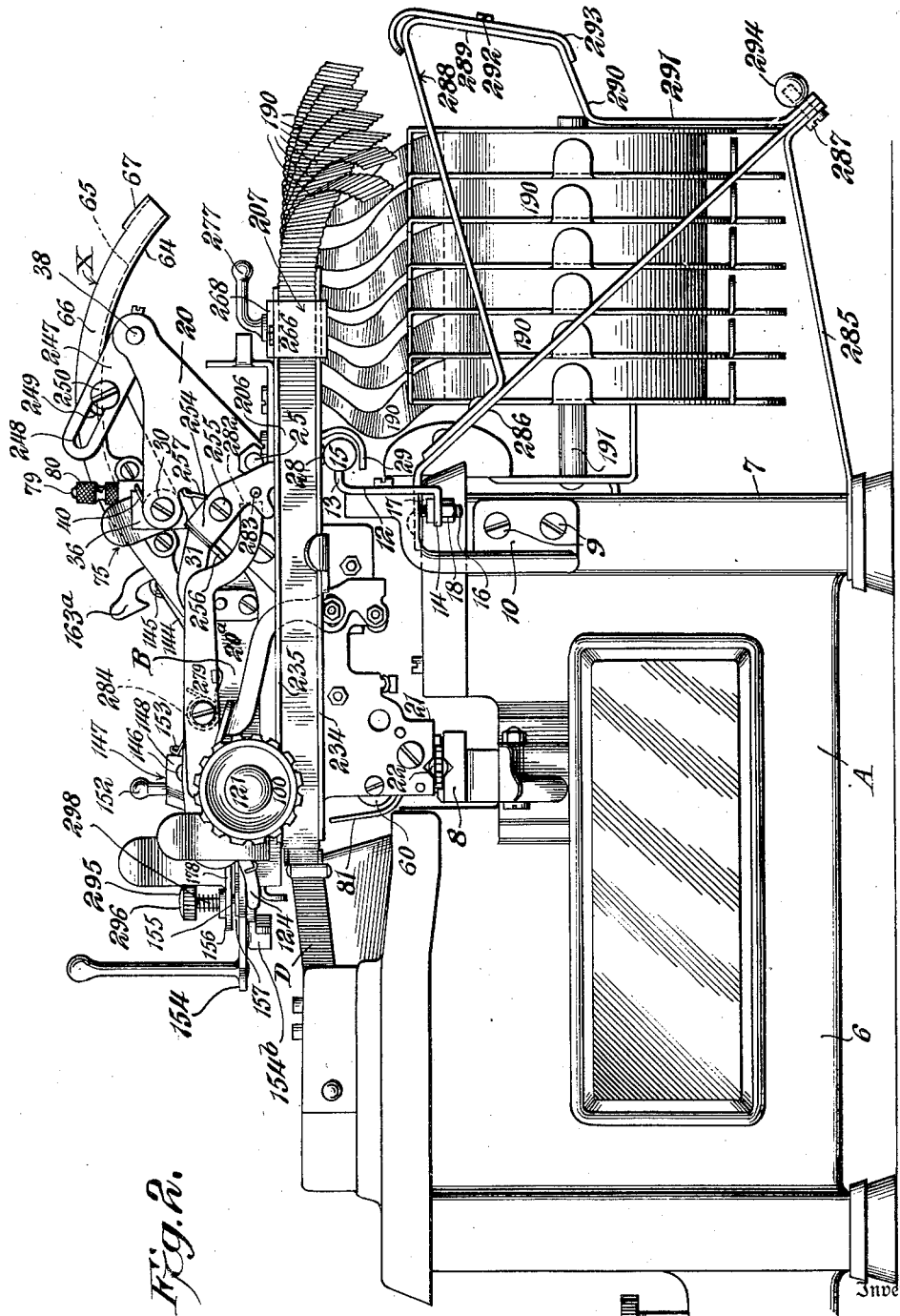

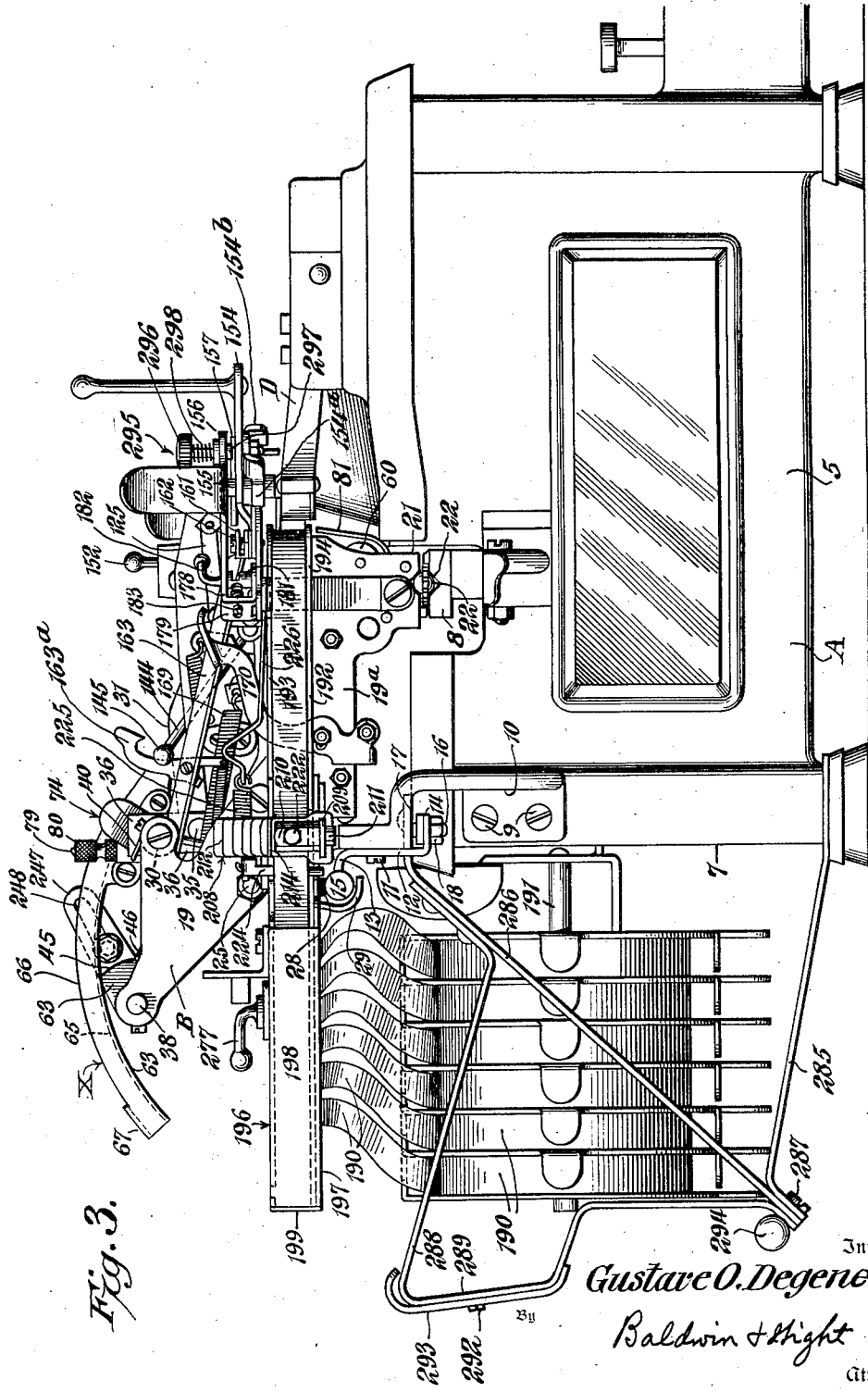

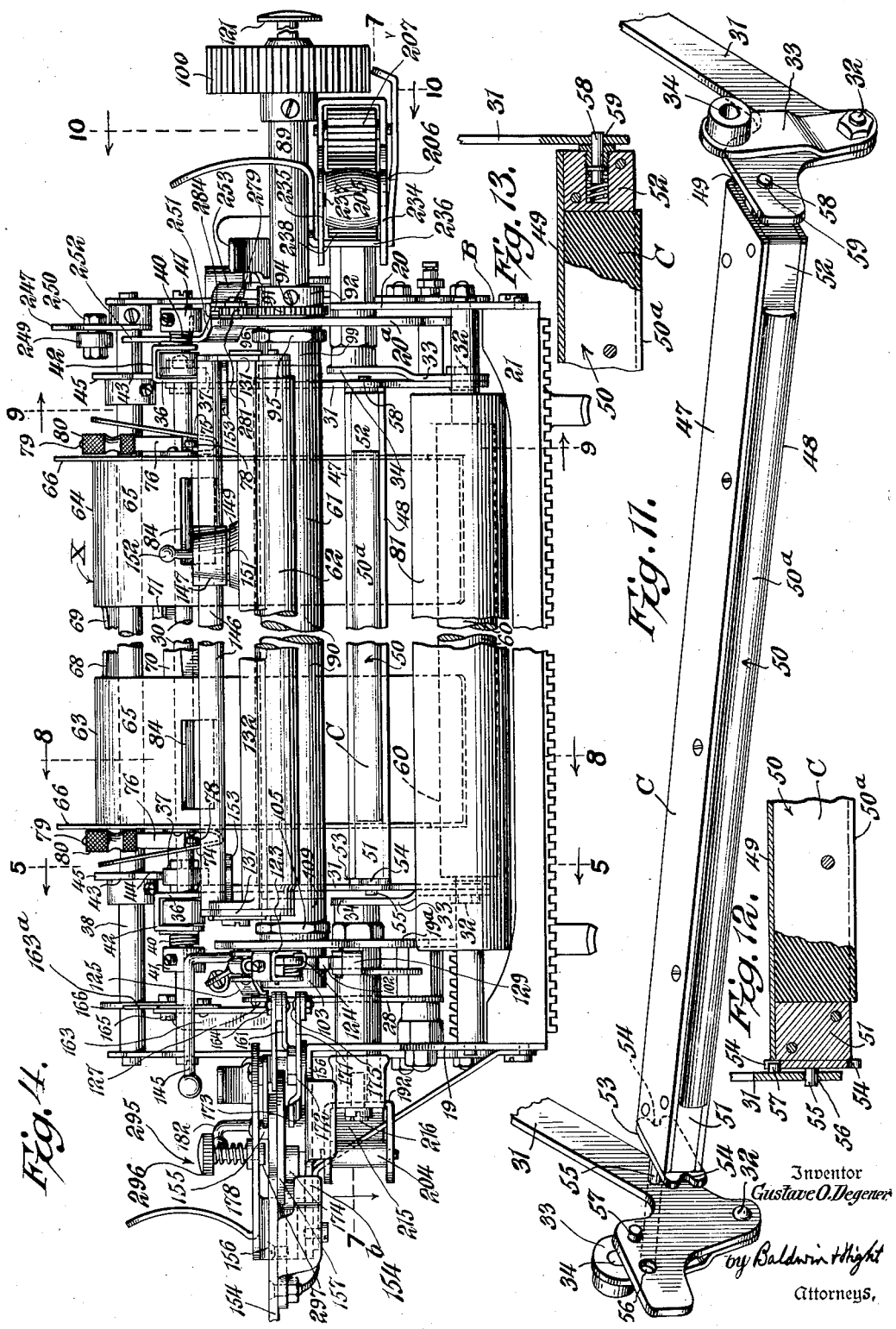

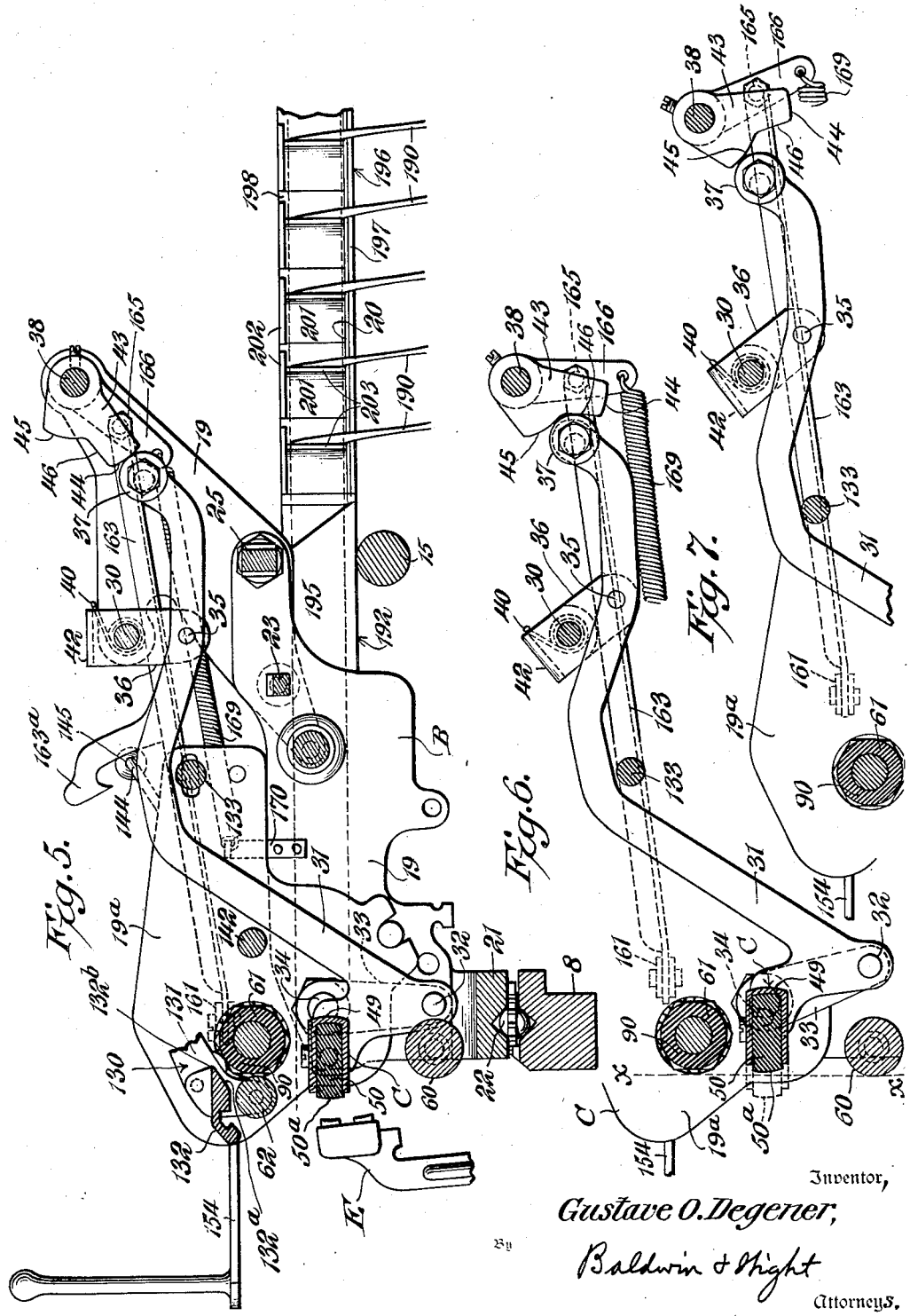

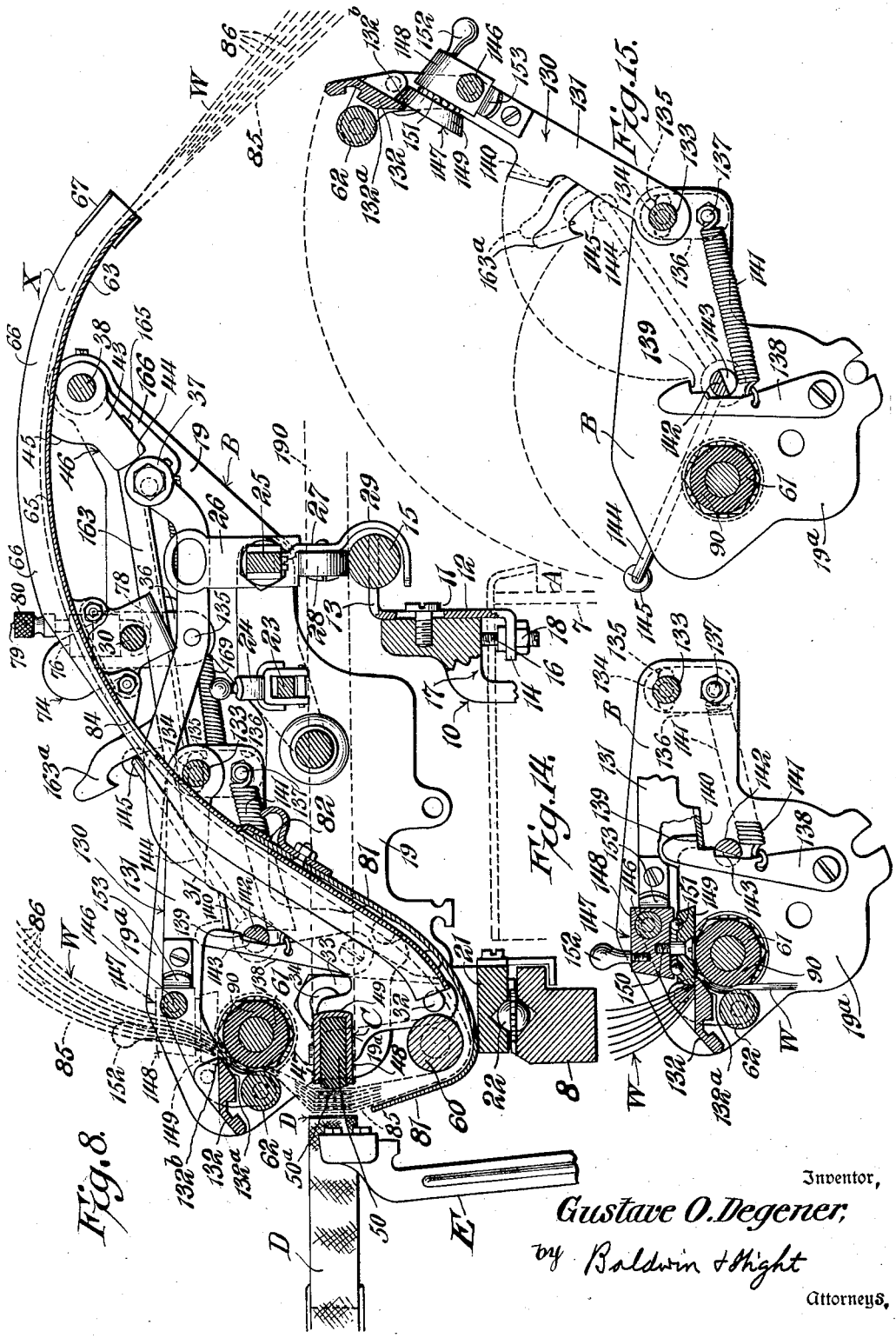

Dec. 13, 1932.  G. O. DEGENER  1,890,563
MANIFOLDING DEVICE
Filed July 30, 1930   12 Sheets-Sheet 7
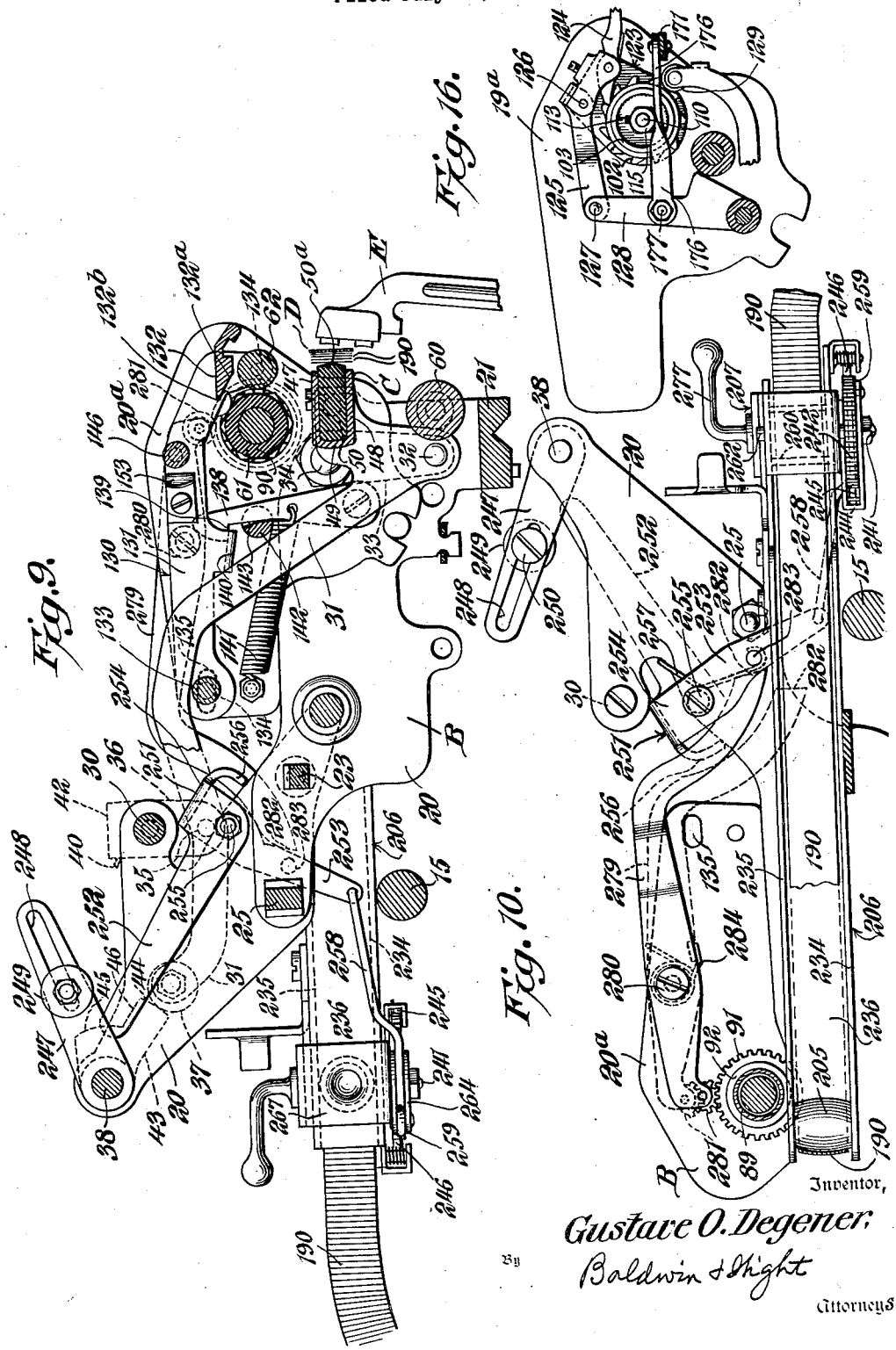

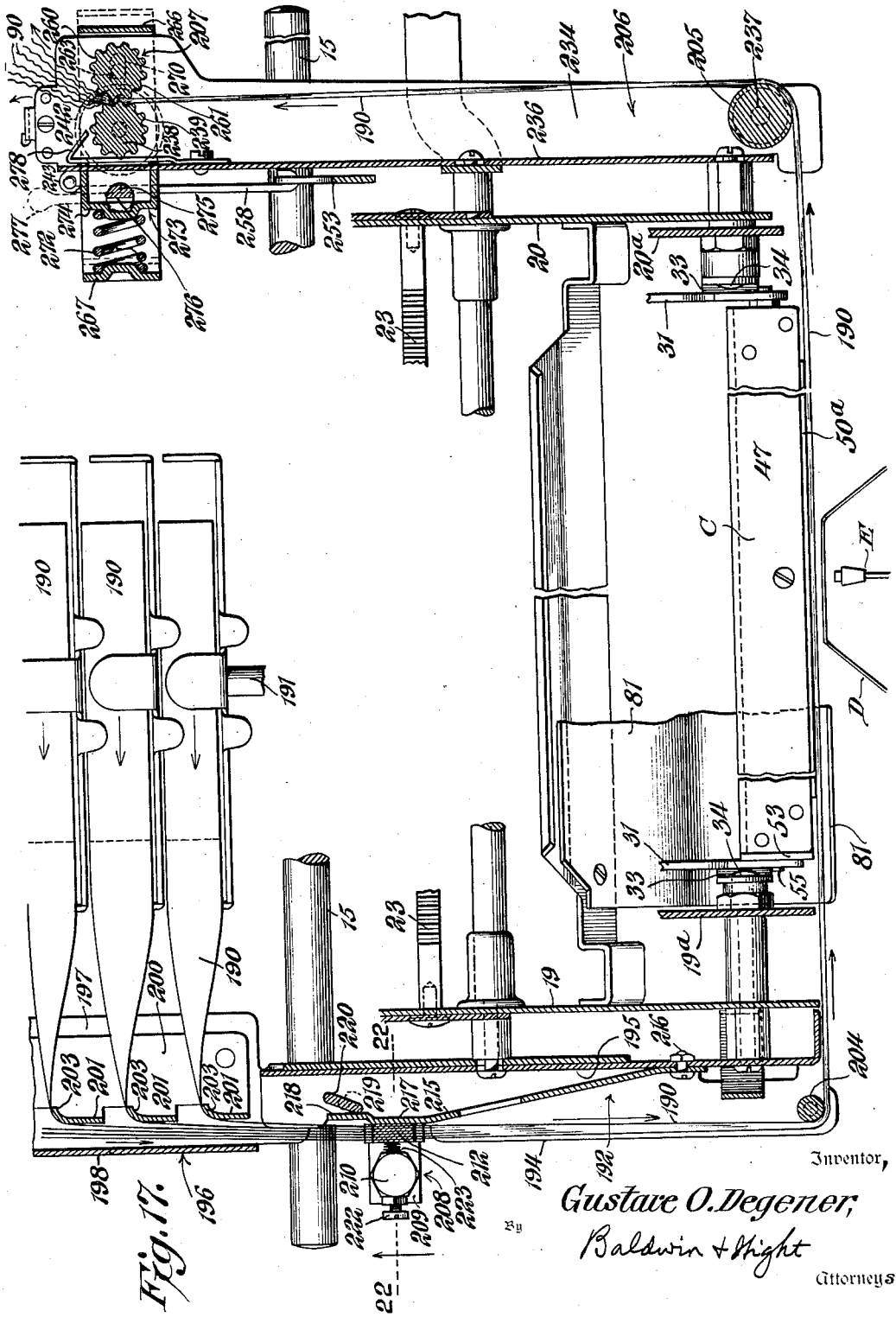

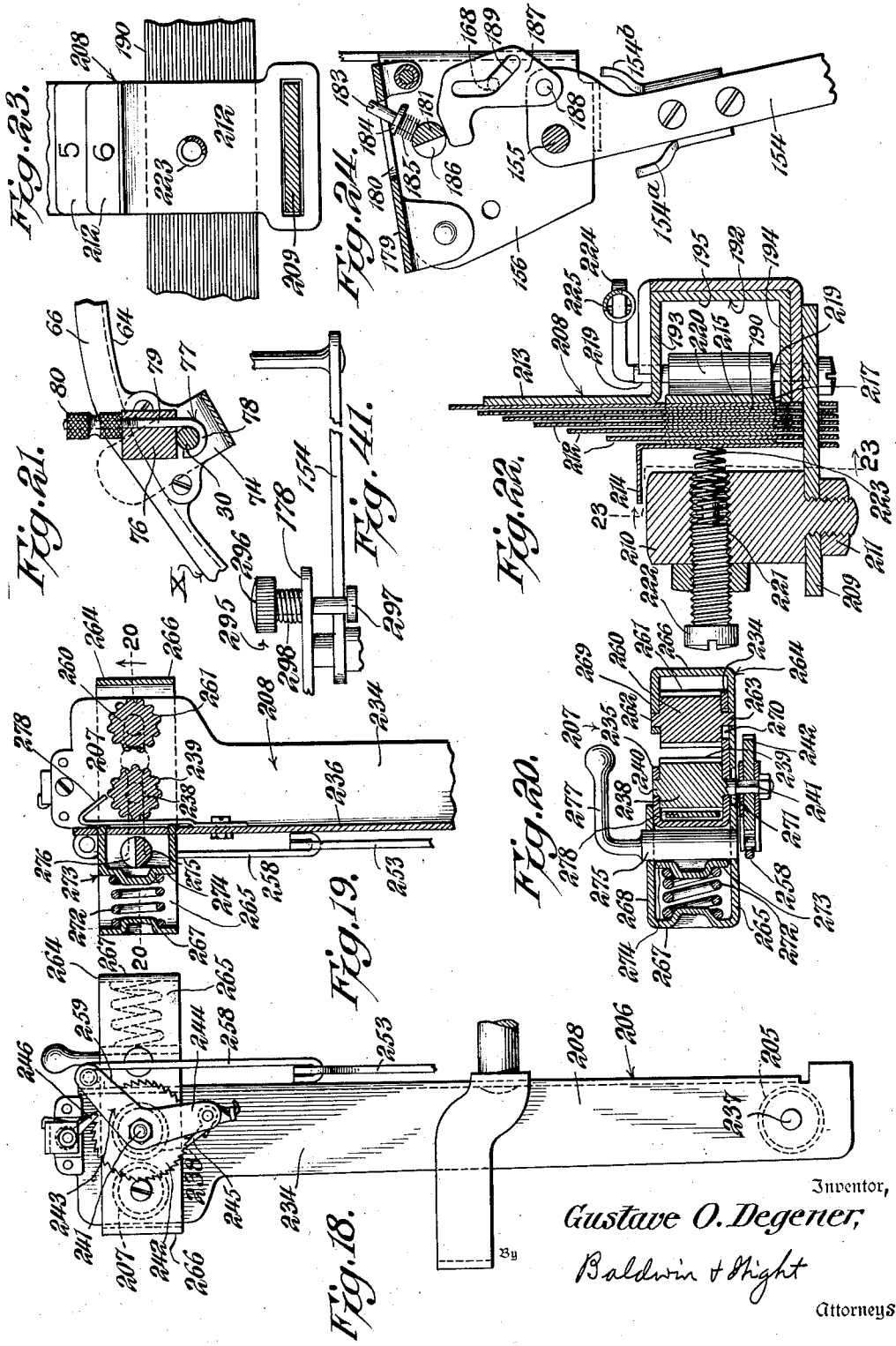

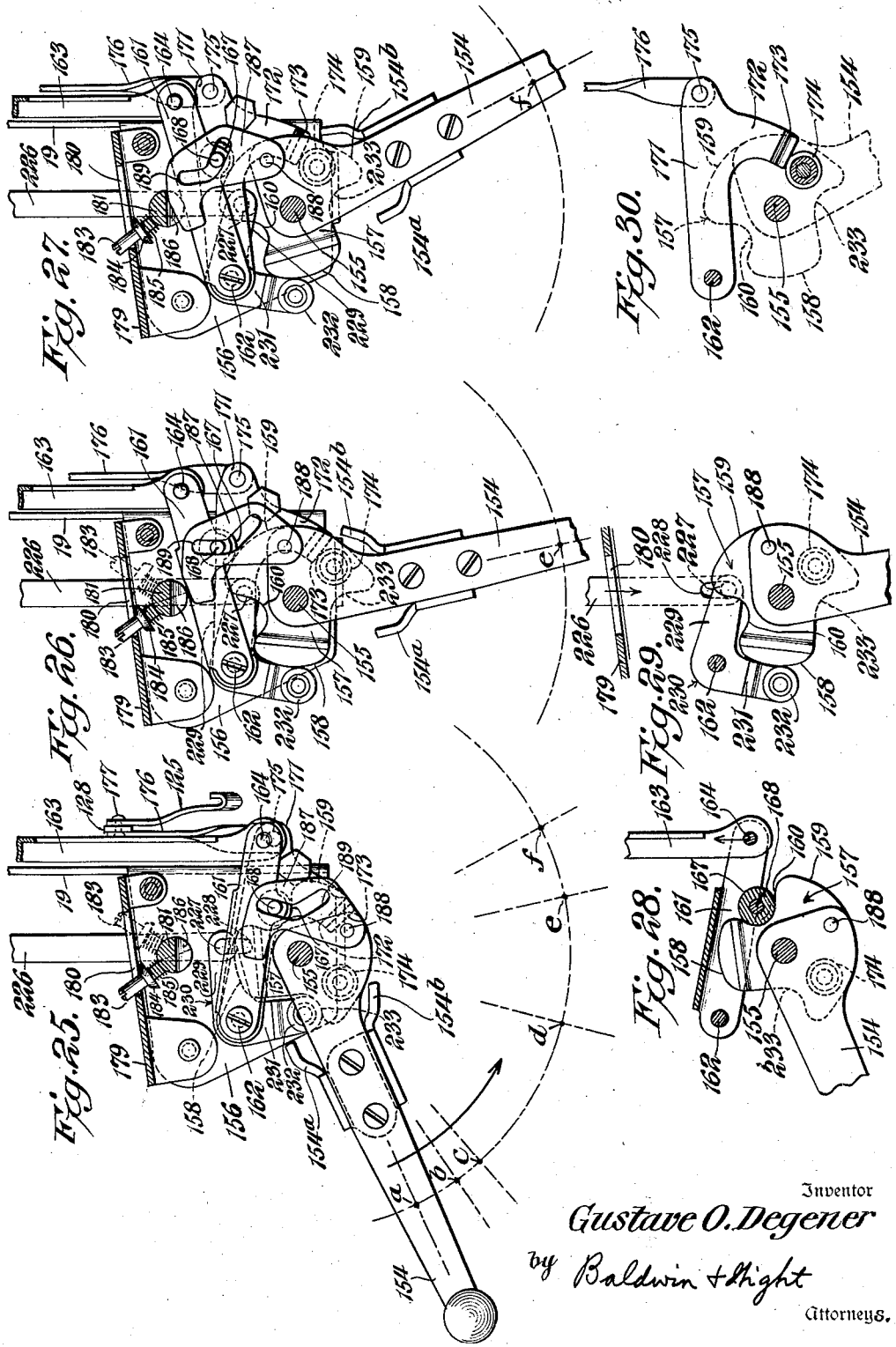

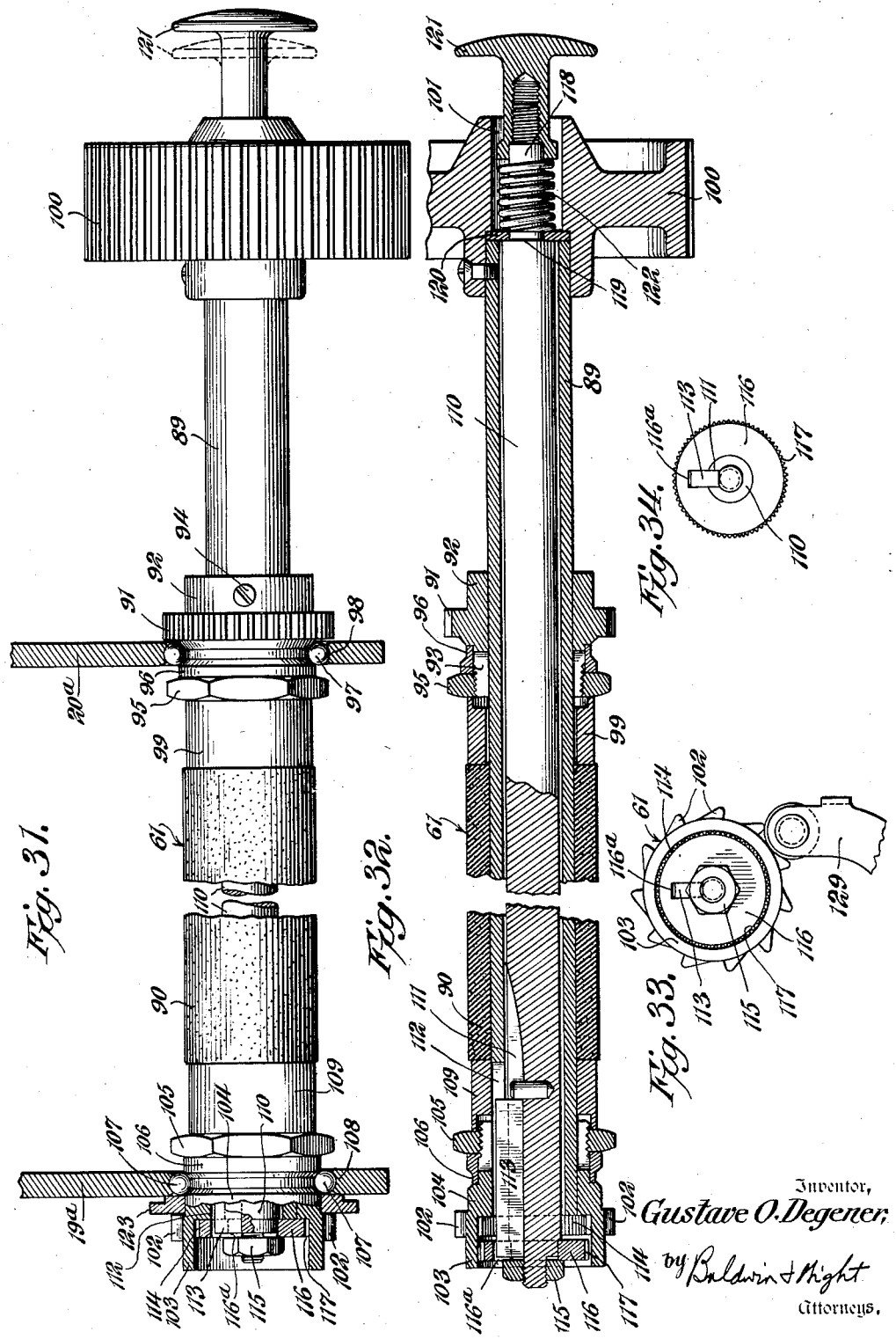
Dec. 13, 1932.  G. O. DEGENER  1,890,563
MANIFOLDING DEVICE
Filed July 30, 1930   12 Sheets-Sheet 11
Inventor,
Gustave O. Degener,
by Baldwin & Wight
Attorneys.

Dec. 13, 1932.                G. O. DEGENER                1,890,563
                           MANIFOLDING DEVICE
                          Filed July 30, 1930          12 Sheets-Sheet 12
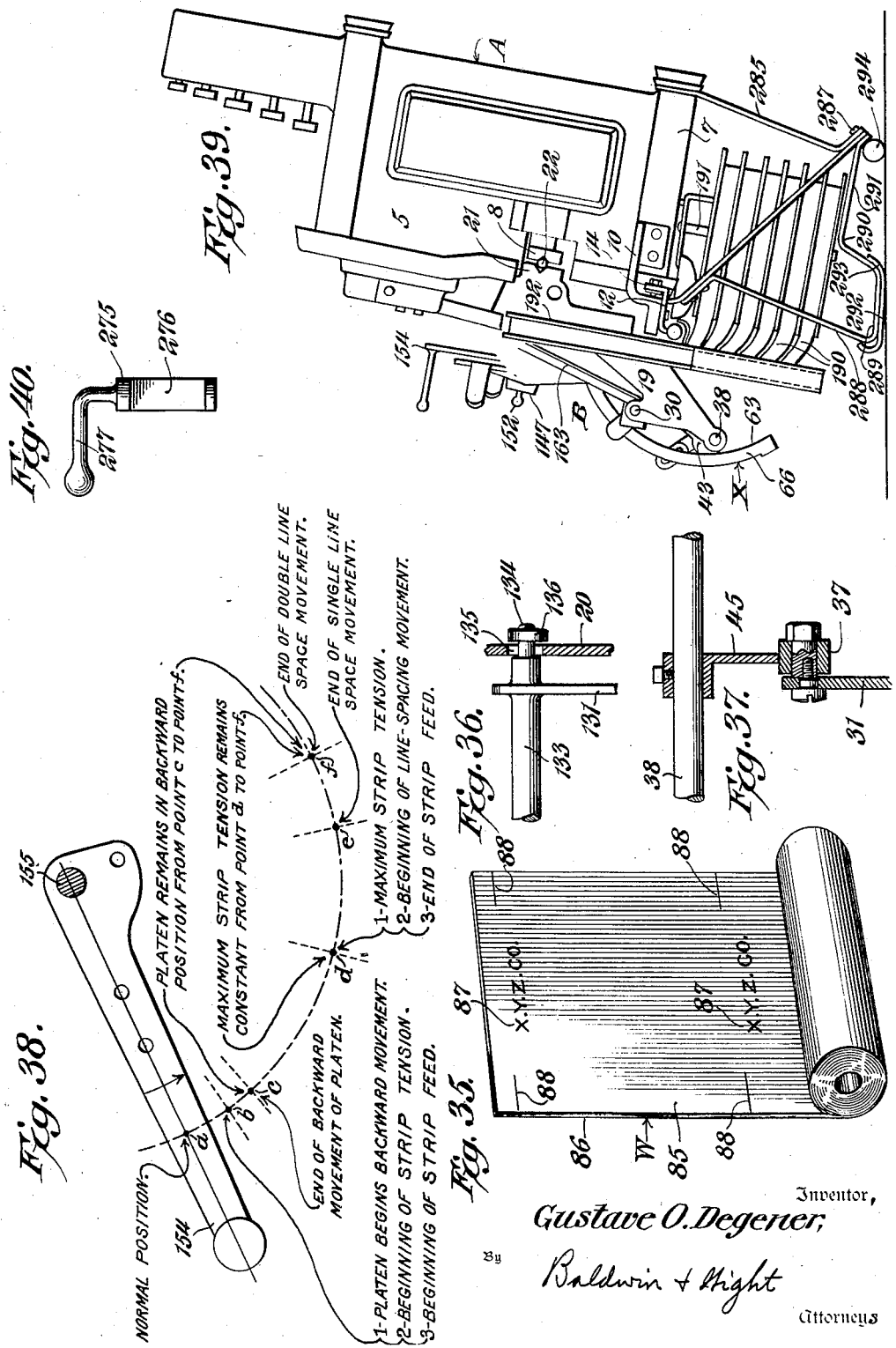
Inventor,
Gustave O. Degener,
By
Baldwin + Hight
Attorneys Patented Dec. 13, 1932

1,890,563

UNITED STATES PATENT OFFICE

GUSTAVE O. DEGENER, OF SAN FRANCISCO, CALIFORNIA, ASSIGNOR TO ROYAL TYPE-WRITER COMPANY, INC., OF NEW YORK, N. Y., A CORPORATION OF NEW YORK

MANIFOLDING DEVICE

Application filed July 30, 1930. Serial No. 471,801.

This invention relates to new and useful improvements in manifolding devices which may be readily attached to any standard typewriting machine without changing such machine in any material respect, and embodies certain improvements over the inventions disclosed in my co-pending applications Serial No. 133,437, filed September 3, 1926, and in the divisional applications thereof Serial No. 194,135, filed May 25, 1927; Serial No. 359,934, filed May 2, 1929 and in the divisional applications thereof Serial No. 452,719, filed May 15, 1930, and Serial No. 452,720, filed May 15, 1930.

This application is not limited to the carbon strip mechanism, whereas applicant's co-pending application Serial No. 471,802, filed July 30, 1930, is thus limited.

The present invention, and likewise the inventions of the co-pending applications above noted, is designed for the purpose of writing on continuous forms of work sheets which are frequently in lengths of several hundred feet. The present invention like that of my co-pending divisional applications Serial No. 452,719, and Serial No. 452,720, is particularly designed for use in continuous letter writing.

Among the several objects of this invention are to provide a single operating lever, such as the carriage return lever, for first bodily moving the platen rearwardly and thereby relieve the normal tight contact relation between the platen and the work sheets and interleaved carbon strips, and to subsequently effect a line spacing movement to the feed rolls whereby the work sheets will be line spaced without dragging the carbon strips therewith; to provide means operated by the lever for applying a tension to the carbon strips and simultaneously feeding said strips during the rearward movement of the platen and for maintaining the maximum strip tension during the line spacing of the work sheets; to provide means for silencing the positive roll whenever it is desired to feed the carbon strips without line spacing the work sheets; to provide a swinging frame for the idle feed roll whereby the latter may be moved from an operative feeding position to an inoperative position for facilitating the initial insertion or loading of the lead-in ends of the work sheets, and to provide a releasable latch for retaining the frame in its normal or operative position; and to support the carbon strip spools directly on the machine frame and to protect the spools by a surrounding frame which may be employed as a foot support for the machine when the latter is turned upwardly on end.

In the accompanying drawings:—

Figure 1 is a top plan view of a typewriting machine constructed in accordance with my invention, Figure 2 is a right hand elevation thereof, Figure 3 is a left hand elevation thereof, Figure 4 is an enlarged front elevation of the carriage showing my invention applied thereto, Figure 5 is a vertical transverse sectional view through the carriage showing the platen in its normal or printing position, parts of the carriage being omitted for the sake of clearance, the view being taken on the line 5—5 of Figure 4, Figure 6 is a somewhat similar view to Figure 5 but showing the platen in its retracted position in full lines, Figure 7 is a detail sectional view with the platen supporting frame in the same position as Figure 6 but showing the platen actuating cams in a different position, Figure 8 is a vertical transverse sectional view through the carriage taken on the line 8—8 of Figure 4 and showing particularly the paper table and the manner of leading the paper along the table between the plurality of ribbons, and between the feed rolls, the view showing the platen in printing position but not showing the platen supporting and actuating means, Figure 9 is a vertical transverse sectional view taken on the line 9—9 of Figure 4, and showing particularly the means for operating the ribbon feed rolls, Figure 10 is a similar view but taken on the line 10—10 of Figure 4 and showing particularly the means for raising and lowering the latch lever, Figure 11 is a perspective view of the reversible but non-rotatable platen, together with front end of the supporting frame links therefor, Figure 12 is a detail horizontal sectional view showing the connection between one end of the platen and the supporting link whereby the platen is retained against rotation, Figure 13 is a detail horizontal sectional view showing the other end of the platen and its connection with the platen supporting link, the view showing particularly the means for releasing the platen from the link, Figure 14 is a detail vertical sectional view showing particularly the paper feed rolls and the paper cutting means disposed above the rolls, Figure 15 is a detail vertical sectional view showing the pivoted frame which carries the idle feed roll and the knife in its inoperative position, Figure 16 is a detail sectional view showing the line spacing ratchet mechanism for the feed roll, Figure 17 is a detail horizontal sectional view showing particularly the course of the auxiliary ribbons from their spools past the printing point to the ribbon feeding means, Figure 18 is an inverted plan showing the intermittent auxiliary ribbon feed mechanism, Figure 19 is a detail horizontal sectional view showing the auxiliary ribbon feeding rolls in separated relation, Figure 20 is a vertical sectional view taken on the line 20—20 of Figure 19, Figure 21 is a detail vertical sectional view showing the means for retaining one of the paper table sections in its adjusted position, Figure 22 is an enlarged cross-sectional view through the auxiliary ribbon tensioning device, taken on the line 22—22 of Figure 17, Figure 23 is a vertical sectional view taken on the line 23—23 of Figure 22, Figure 24 is an enlarged detail horizontal sectional view showing the carriage return lever and the means cooperating therewith adapted to limit the lever to a single line space movement, Figure 25 is a fragmentary plan view showing the carriage return lever in its normal position prior to effecting a backward movement to the platen, an auxiliary ribbon feeding movement, and a line spacing movement to the feed roll, Figure 26 is a similar view but showing the carriage return lever after it has been moved toward the right a distance sufficient to effect backward movement to the platen, an auxiliary ribbon feeding movement, and a single line spacing movement to the feed roll, Figure 27 is a view similar to Figure 26 but showing the carriage return lever after it has been moved to a position to effect a double line spacing movement to the feed roll, Figure 28 is a fragmentary horizontal sectional view showing the carriage lever cam in its normal position for operating the mechanisms for imparting backward movement to the platen and feeding movements to the auxiliary ribbons, Figure 29 is a similar view but showing the relation between the carriage return lever cam and the cooperating mechanism for applying tension to the auxiliary carbon ribbons, the view showing the position of the parts after maximum tension has been applied, Figure 30 is a similar view but showing the relation between the carriage return lever cam and the lever for actuating the paper feed roll line spacing mechanism, Figure 31 is an enlarged top plan view of the intermittently actuated paper feed roll, a part thereof being in section to show the driving clutch in actuated relation, Figure 32 is a longitudinal sectional view taken through Figure 31, the clutch being shown disconnected, Figure 33 is a left hand end elevation of Figure 31 and showing the overthrow roller associated with the line spacing ratchet wheel, Figure 34 is a view in elevation of the movable clutch element, Figure 35 is a reduced perspective view of the work sheets, Figure 36 is a detail view partly in section showing the limited pivotal support for the idle roll carrying frame, Figure 37 is a detail view showing the means for eccentrically mounting one of the cam rollers on the platen carrying frame, Figure 38 is a diagrammatic view showing the various positions of the carriage return lever and its relation to the backward movement of the platen, the auxiliary tensioning means, the auxiliary ribbon feeding means, and the line spacing means, Figure 39 is a diagrammatic view showing the mechanism supported on the end frame, Figure 40 is a detailed elevation showing the operating cam shaft for the idle feed roll of the ribbon feeding mechanism, and Figure 41 is a detail view showing the stop means for retaining the carriage return lever at an intermediate point in its movement.

The invention as illustrated in the accompanying drawings is shown as being applied to the well known standard Royal typewriting machine, but it is to be understood that my invention is adapted to be applied to other types of typewriting machines, or to calculating machines or the like. The typewriting machine includes a main frame A, a carriage B, a platen C, a main ribbon D, and type bars E which are operated in the usual manner.

The main frame A includes side walls 5 and 6 and a rear wall 7. Fixed to the main frame A is a bottom rail 8 for supporting the carriage B. Connected to the side walls 5 and 6 of the main frame by screws 9 adjacent the rear wall 7 are brackets 10, 10 and supported on each bracket for vertical adjustments through the medium of a screw and slot connection 11 is a secondary bracket 12 having a rearwardly extending arm 13 at its upper end and a forwardly extending arm 14 at its lower end. The upper arms 13 are connected to a supporting rear rail 15 which extends transversely of the machine in parallelism with the bottom rail 8 but in a higher horizontal plane than the latter. An adjusting screw 16 is carried by the lower arm 14 of each secondary bracket 12 for cooperation with a stop shoulder 17 formed on the bracket 10, and a clamping nut 18 is connected to the screw 16 for the purpose of retaining the latter in any position of adjustment. Thus by loosening the slot and screw connection 11 at either end of the rear rail 15, the bracket 12 may be properly adjusted to suit working conditions, and the parts so adjusted held against accidental movement.

The carriage B includes outer end plates 19 and 20 and rigidly connected inner end plates 19ª and 20ª. Fixed to the outer end plates is a top rail 21 which is disposed above the bottom rail 8 of the carriage and located between said upper and lower rails is a series of anti-friction balls 22. Also fixed to the end plates 19 and 20 of the carriage is the usual marginal stop bar 23 having marginal stops 24 mounted thereon and the usual tabular stop bar 25 having stops 26 mounted thereon. The tabular stop bar 25 is disposed directly above the rear rail 15 and a pair of brackets 27 are fixed to said bar 25 and depend therefrom. Journaled on each bracket 27 is a roller 28 which rides on the rear rail 15. The lower end of each bracket 27 extends downwardly below the roller 28 and forms into a hook 29 which partially embraces the rail 15 and co-operates therewith to retain the carriage against upward movement, although permitting the carriage to move longitudinally of the rail. Also fixedly conected to the side plates 19 and 20 of the carriage is a cross rod 30 which is disposed above and at a point intermediate the marginal stop bar 23 and the tabular stop bar 25.

The platen C is adapted to be moved bodily toward and away from a type bar E when the latter is in printing position, or in other words, the platen is capable of being bodily moved toward and from the printing point. The platen C is removably mounted on a movable frame which consists of a pair of supporting links 31, 31 which extend rearwardly from the platen. The forward ends of these links are pivotally connected as at 32, 32 with the lower ends of depending links 33, 33 which are in turn pivotally connected as at 34, 34 to the inner end plates 19ª and 20ª of the carriage. The rear end portions of the links 31 are pivotally connected as at 35, 35 to the lower ends of depending links 36, 36 which are fulcrumed on the cross rod 30. The rear ends of the supporting links 31 extend rearwardly beyond the swinging links 36 and are each provided with an eccentrically mounted and adjustable cam roller 37. Journaled on the end plates 19 and 20 and at the rear ends thereof is a rock shaft 38. The platen C is normally urged rearwardly by means of coil springs 40, 40 which are wound around the cross rod 30, one end of each spring being fixed to a collar 41 fixed to the cross rod 30, and the free end of each spring engaging under an ear 42 bent over from the upper end of the associated swinging link 36.

In order to positively move the platen C forwardly against the tension of the springs 40 and to retain said platen in its forward or writing position and against the force of type impacts, I have fixed to the rock shaft 38 a pair of cam arms 43, 43. Each cam arm 43 includes two concentric surfaces 44 and 45 of different radii, the latter being closer to the rock shaft 38 than the former, and a connecting eccentric or cam portion 46. These cam arms engage the respective cam rollers 37 which are journaled on the platen supporting links 31. The cam arms 43 are arranged on the rock shaft 38 in the same angular relation and consequently both cam arms cooperate with the cam rollers 37 simultaneously and in unison. Assuming the platen to be in its front or normal writing position, as shown in Fig. 5, it will be apparent that when the rock shaft 38 is rocked in an anti-clockwise direction the cam arm 43 will be moved so that the cam roller 37 will move onto the eccentric or cam portion 46 of the cam arm and thereby permit the return springs 40 to swing the links 33 and 36 and thereby move the platen supporting links 31 together with the platen in a rearward direction. This rearward movement is continued until the cam rollers 37 engage the concentric portions 45 of the cam arms 43. In this position of the parts as shown in Figure 6 the platen is in its rearmost position and further rocking movement of the rock shaft 38 will neither permit further rearward movement of the platen nor move the platen forwardly because the cam rollers 37 are riding on the concentric portions 45 of the cam arms. When, however, the shaft 38 is rocked in a clockwise direction the cam rollers 37 will ride along the eccentric or cam portions 46 of the cam arms and cause the platen to be bodily moved forwardly against the tension of the springs 40 until said cam rollers 37 engage the concentric portions 44 of said cam arms, as shown in Figure 5. In this position of the parts type impacts upon the platen will be adequately resisted by the cam arm 43 and therefore the platen will effectively cooperate with the type arms E to make proper impressions.

The platen C is non-rotatable and is reversible so as to present either a relatively soft printing surface or a relatively hard printing surface to the type. When it is desired to employ a large number of record copies the hard surface is used and when it is desired to employ a comparatively small number of record copies the soft surface is used. The platen consists of an elongated member or casing which is U-shaped in cross section and is formed of sheet metal or other hard substance. This casing includes spaced top and bottom walls 47 and 48 and a transversely curved or convex printing surface 49. The casing is filled with an insert 50 of rubber or other relatively soft material, the face 50ª thereof opposite the connecting portion 49 being correspondingly curved to form a printing surface. Thus the connecting portion 49 forms a relatively hard printing surface and the outer face 50ª of the insert 50 forms a relatively soft printing surface. The platen C is connected to the supporting links 31, 31 in a manner to permit the platen to be reversed so as to present either the hard printing surface or the soft printing surface to the type. Disposed within and located at opposite ends of the platen casing are metal filler blocks 51 and 52 respectively. Secured to the outer end of the filler block 51 is a plate 53 and the ends of this plate project beyond the front and rear edges of the casing, and each projecting portion is formed with a locking recess 54. Extending longitudinally of the platen from the plate 53 is a pin 55 which is engageable in an opening 56 formed in one of the supporting links 31. The pin 55 is disposed equidistant from the recesses 54, 54 and consequently either of said recesses 54 is adapted to engage a fixed stop pin 57 secured to the supporting link 31 having the opening 56. Carried by the filler block 52 is an outwardly pressed spring pin 58 which is adapted to engage in an opening 59 formed in the other supporting link 31. Thus when it is desired to reverse the platen C the pin 58 is pressed inwardly so as to become disengaged from the associated link 31, and the platen is then withdrawn from engagement with the other supporting link 31. The platen is then reversed, the pin 55 is inserted in the opening 56 and the proper recess 54 is engaged with the stop pin 57, after which the pin 58 is repositioned in the opening 59. Thus the platen is held against rotation, is readily removable, and is likewise readily reversible so as to present either of two different printing surfaces to the type.

Disposed below the platen C and rotatably supported on the end plates 19 and 20 of the carriage is a guide roll 60 for the work sheets, and disposed above the platen are means for feeding the work sheets past the platen, this feeding means including an intermittently operable feed roll 61 and a cooperating idle roll 62.

In order to guide the work sheets W to the printing surface of the platen C, I have provided a table X. This table X is formed of sheet metal and preferably consists of two sections 63 and 64 which are independently supported on the cross rod 30 for adjustments toward and from each other for the purpose of accommodating work sheets of different widths. Each section includes a base portion 65 and an upstanding guiding flange 66, said flanges being disposed along the outer edges of the bases 65. These table sections extend fore and aft of the machine and connected to the rear end of each guide flange 66 is an overhanging guide lip 67 which retains the work sheets against upward movement during their passage along the table. The table sections 63 and 64 are of relatively narrow width so as to create a relatively wide space between the sections for the purpose of permitting easy access to the marginal stops 24 and the tabular stops 26. The rear ends of the sections are respectively formed with inwardly extending supporting projections 68 and 69 which cooperate to form a central support for the work sheets W at the rear end of the table. In order to provide a central support for the work sheets W, and also to provide means for retaining the table sections against wobbling in a plane transverse to the line of feed of the work sheets, I have provided the table sections with inwardly extending supporting arms 70 and 71 respectively. These arms are disposed in overlapping relation and are located centrally between the front and rear ends of the table, the inner ends of the arms being respectively provided with downwardly extending perforated guides 72 and 73 respectively, the cross rod 30 being slidably fitted in the perforations. The table sections as shown particularly in Figure 8 are curved downwardly and forwardly and the sections are freely mounted on the cross rod 30 through the medium of V-shaped sheet metal brackets 74 and 75 which are rigidly secured to the vertical guide flanges 66, 66 of the sections. Both arms of each V-shaped bracket are perforated to slidably fit the cross rod 30. In order to retain the sections in any adjusted position along the cross rod 30, I have provided clamping blocks 76, 76, which are located between the walls of the V-shaped brackets 75 and above the cross rod 30. A clamping hook 77, comprising a beak 78 and a threaded shank 79, is associated with each block 76 and with the cross rod 30. The shank 79 extends upwardly through an opening formed in the block 76 and the beak 78 extends under the cross rod 30. A clamping nut 80 is threaded onto the upper end of the shank 79 so as to draw the beak 78 and the block 76 tightly against the cross rod 30 and thereby retain the associated table section in an adjusted position. The forward ends of the table sections overlap a paper guide or chute 81 which is formed of sheet metal. This guide or chute 81 is rigidly connected to the end walls 19 and 20 of the carriage. The paper guide or chute 81 extends downwardly and forwardly from a point in rear of the lower guide roll 60, thence under said roll in spaced relation thereto and thence upwardly and forwardly to a point below the platen C and in spaced relation thereto. In order to prevent the table sections from swinging on the cross rod 30, the sections are provided with struck out guide lips 82, 83 which are depressed and are disposed below the upper edge of the apron or guide chute 81 and have sliding contact therewith. The base portions 65 of the table sections are respectively provided with rectangular openings 84, 84 through each of which the operator may insert a finger for adjusting a marginal stop 24 located directly thereunder.

The work sheets W preferably consist of a main or original sheet 85 and a plurality of second sheets 86. These sheets as shown in Figure 35 are arranged in superposed relation and are of indeterminate length, the sheets being made up in roll form. As previously stated this machine is particularly adapted for continuous letter writing and therefore the main or original sheet 85 is preferably provided on its front face with a plurality of suitable printed heads 87 arranged in uniformly spaced relation. The original sheet 85 is also provided on its front face with a plurality of printed marks 88 arranged along the side edges of the sheet for the purpose of indicating the lines of division between the connected letter forms.

The intermittently operable feed roll 61 is journaled in the inner end plates 19a and 20a of the carriage. This feed roll 61 includes a tubular shaft 89 having a rubber or other yieldable roll 90 fitted tightly therearound. A toothed wheel 91 is fitted around the tubular shaft 89 and integral therewith is a solid hub 92 and a longitudinally slotted hub 93, a screw 94 is threaded into the solid hub 92 for cooperation with the tubular shaft 89 to clamp the toothed wheel 91 against rotation relative thereto. The outer surface of the split hub 93 is threaded and is engaged by a clamping nut 95. Disposed between the nut 95 and the toothed wheel 91 is an annulus or inner bearing 96 having a plurality of anti-friction balls 97, the balls cooperating with an outer bearing 98 formed by the opening in the end plate 20a through which the feed roll is passed. A spacing sleeve 99 is disposed between the adjacent end of the rubber sleeve 90 and the clamping nut 95. The right hand end of the tubular shaft 89 projects considerably to the right from the end plate 20a of the carriage and fixed to the projecting end of this tubular shaft is a hand wheel 100 having an axial bore 101 disposed in alinement with the shaft 89. The other end of the shaft 89 is provided with a ratchet wheel 102 having an outwardly extending hub 103 and an inwardly extending hub 104, the latter being longitudinally slotted and exteriorly threaded to receive a clamping nut 105. Disposed between the hub 104 and the clamping nut 105 is an annulus or inner bearing 106 having a plurality of anti-friction balls 107, the outer bearing 108 for the balls being formed by the opening formed in the end plate 19a of the carriage through which the feed roll is passed. A spacing sleeve 109 is disposed between the nut 105 and the adjacent end of the rubber sleeve 90. The ratchet wheel 102 together with the hub portions 103 and 104, and the clamping nut 105, are capable of being rotated about the tubular shaft 89. Under some circumstances as will be hereinafter explained, it is desirable to intermittently rotate the shaft 89 through the medium of the ratchet wheel 102 and consequently I have provided a manually operable clutch connection between the ratchet wheel 102 and the shaft 89. This clutch connection is normally in engaged relation so as to intermittently rotate the shaft 89 upon rotation of the ratchet wheel 102. Manually operable means are provided, however, for disengaging the clutch connection at will so as to permit the ratchet wheel 102 to be given an idle movement without imparting a feeding movement to the shaft 89. To this end, I have slidably mounted a rod 110 within the shaft 89, the rod being co-extensive with said shaft. The left hand end of the rod 110 is formed with a longitudinal groove 111 and the left hand end of the shaft 89 is formed with a longitudinal slot 112 which registers with said groove. A key 113 is fitted in the groove 111 of the rod and has sliding engagement in the slot 112 of the shaft 89. Thus the rod 110 is always compelled to rotate with the shaft 89 but is capable of being moved longitudinally thereof. The inner face of the hub 103 of the ratchet 102 is provided with a circumferential series of clutch teeth 114. The left hand end of the rod 110 projects into the plane containing the clutch teeth 114, and clamped to said end by a nut 115 is a clutch disc 116 having clutch teeth 117 on its periphery. The left hand end of the key 113 projects into an opening 116a formed in the clutch disc 116 and serves to retain said disc against rotation relative to the tubular shaft 89 and rod 110. The clutch teeth 114 and 117 are normally disposed in clutching engagement but it will be readily appreciated that when the rod 110 is moved to the left the clutch disc 116 will be carried therewith and consequently the clutch teeth will be disconnected and the clutch will be uncoupled. The right hand end of the rod 110 is provided with a reduced extension 118 forming a resultant stop shoulder 119. Fitted around the extension 118 and lying against the stop shoulder 119 is a ring or collar 120. The extreme outer end of the reduced extension 118 is threaded to receive a hand piece 121, and disposed around the extension 118 between the collar 120 and the hand piece is a coil spring 122 which functions to yieldably retain the rod 110 in its normal clutching position. When, however, the operator presses on the hand piece 121 the rod 110 will be moved toward the left against the tension of the spring 122 and the clutch will be disconnected thereby freeing the ratchet wheel 102 from driving relation with the tubular shaft 89. For intermittently rotating the feed roll 61, there is provided an arm 123 which is journaled on the hub 104 between the ratchet wheel 102 and the end plate 19ª. Pivotally supported on the arm 123 is a spring pawl 124 for engaging the teeth of the ratchet wheel 102. A link 125 is pivotally connected at one end as at 126 to the arm 123 and at its other end as at 127 to a lever 128, the latter being oscillated by a mechanism which will be herein described. A detent 129 of the roller type cooperates with the teeth of the ratchet wheel 102 to prevent overthrow thereof.

The idle feed roll 62 which cooperates with the intermittently actuated feed roll 61 to feed the work sheets past the platen C, is journaled at its ends in a movable frame 130. This frame includes parallel arms 131, 131 which extend rearwardly from the idle roll 62, the latter being journaled in the forward ends of said arms. A relatively stationary cutter bar or knife 132 is disposed above the idle roll 62 and has its ends fixedly secured to the front ends of the arms 131. This cutter bar 132 is under beveled as at 132ª to form a resultant straight cutting edge 132ᵇ. Fixed to the rear ends of the arms 131 is a pivot shaft 133 which is disposed below the table sections 63 and 64, the arms 131 being located between the table sections and the end plates of the carriage. The pivot shaft 133 has its ends projecting beyond the arms 131 and these projecting ends are formed with reduced end portions 134, 134 which project through slots 135, 135 formed in the end plates 19ª and 20ª of the carriage, and are pivotally connected to the upper ends of the vertically disposed links 136, 136, the lower ends of said links 136 being pivotally connected by screws 137, 137 to the respective end plates of the carriage. Thus the frame is capable of being bodily moved rearwardly and forwardly for a limited distance equal to the length of the slots 135, and the frame is also capable of being swung upwardly and rearwardly so as to move the idle roll 62 from an operative position to an inoperative position. As thus far described, it will be apparent that when the frame 130 is in its normal position the idle roll 62 will be located in front of the positive feed roll 61 but will not have tight contact therewith due to the loose pivotal connection between the frame 130 and the end plates of the carriage. It is desired to lock the frame 130 in its normal position and also to yieldably urge the same rearwardly whereby the idle roll will yieldingly engage the positive feed roll 61 and thereby effect a proper feeding of the work sheets W. To this end, I have provided a pair of latches 138, 138 which are respectively pivoted at their lower ends to the inner faces of the end plates 19ª and 20ª of the carriage. The upper end of each latch 138 is provided with a nose 139 which is adapted to overhang a laterally extending lug 140 carried by the adjacent arm 131 of the frame 130 and thereby hold said frame against upward swinging movements. Each latch is yieldably held in engagement with the associated lug 140 by means of a coil spring 141, one end of the spring being connected to the latch and the other end being connected to the screw 137 of the supporting links 136. Journaled in the end plates 19ª and 20ª of the carriage and located immediately in rear of the latches 138 is a cam shaft 142. This shaft is provided with recesses or cam surfaces 143, 143 in register with the latches 138. Fixed to the left hand end of the shaft 142 is a manually operable lever 144 having its outer end bent into a horizontal handle 145. When the idle roll 62 is in its normal feeding position the hand lever 144 is in its rearmost position and the cam surfaces 143 are engaged by the rear edges of the latches 138, the springs 141 yieldingly urging the frame 130 rearwardly so as to maintain yieldable feeding contact relation between the positive and idle feed rolls 61 and 62. When the hand lever 143 is swung forwardly the cam shaft 142 will be rocked and the cam surfaces 143 will force the latches 138 forwardly thereby relieving the yieldable contact relation between the positive and idle rolls 61 and 62. Thus when the operating lever 144 is in its forward position the idle roll carrying frame 130 may be readily swung upwardly from its normal or operating position to its abnormal or inoperative position.

It is desirable to sever each letter form immediately after the writing thereon has been completed. For this purpose the relatively stationary cutter bar 132 is provided. This cutter bar is flat and is disposed in a horizontal plane so as to form a straightedge. Journaled on the arms 131, 131 of the frame 130 is a rod 146. This rod is disposed in rear of the straight-edge 132 and slightly above the plane thereof. Slidably mounted on the rod 146 is a cutting element 147. This cutting element includes a block 148 which is transversely bored to receive the rod 146 and a rotary cutter 149 is rotatably mounted on the under side of the block 148 through the medium of a pivot screw 150. Disposed between the rotary cutter 149 and the block 148 is a plurality of anti-friction balls 151. The diameter of the cutter 149 is sufficient to permit the same to overlap the straight-edge 132 and cooperate therewith upon bodily movement of the cutting element 147 along the rod 146 to effectively sever the work sheets between adjacent forms thereof. In order to assist the operator in moving the cutting element along the supporting rod, the block 148 is provided with a finger piece 152. Connected to the side arms 131, 131 are spring fingers 153, 153 which cooperate with the supporting rod 146 to frictionally retain the cutting element 147 at either side of the frame 130.

The work sheets W pass upwardly from under the guide roller 60 past the platen C and the leading ends are then positioned between the feed rolls 61 and 62. In the normal or forward position of the platen C the front or printing face thereof is disposed in front of a vertical line $x$—$x$ which is tangent to the front edges of the lower guide roll 60 and the positive feed roll 61, as shown in Figure 6. Consequently in the normal position of the platen C the work sheets W are bowed forwardly and have relatively tight contact relation with the platen, as shown in Figure 8. It is desirable to relieve the tight contact relation between the work sheets and the platen during the line spacing of the work sheets. The platen C is adapted to be bodily moved rearwardly from its normal writing position to a position wherein the front face of the platen is located at or slightly in rear of the line $x$—$x$.

In order to effect a rearward bodily movement of the platen C immediately prior to each line spacing operation of the positive feed roll 61 so as to relieve the normal tight contact relation between the work sheets and the platen during each line spacing operation, I have provided a carriage return lever 154 and have suitably connected the same with the rock shaft 38 and with the lever 128, whereby upon swinging movement of the carriage return lever to the right as viewed in Figure 1 the platen will first be moved rearwardly from its writing position and the feed roll 61 will then be given its feeding movement, after which the carriage will be shifted to the right, and finally the carriage return lever will be released and automatically returned to its normal position and simultaneously therewith the platen will be returned to its normal or writing position.

The carriage return lever 154 is pivotally mounted as at 155 to a horizontally disposed bracket 156 which is integral with or otherwise rigidly connected to the end plate 19 of the carriage. Limiting stops 154$^a$ and 154$^b$ are fixed to the lever for engagement with the bracket 156. Fixedly secured to the pivot end of the carriage return lever is a cam plate 157 having spaced concentric edge portions 158 and 159 between which is located a recess 160 having an eccentric edge portion which merges with the concentric edge portions 158 and 159. A lever 161 is connected at one end by a pivot screw 162 to the bracket 156 and a rearwardly extending link 163 is pivotally connected at its forward end as at 164 to the free end of the lever 161 and at its rear end as at 165 to a rock arm 166 fixed to the rock shaft 38. A roller 167 is journaled on a vertical pin 168 carried by the lever 161, and normally this roller 167 is engaged in the recess 160 of the carriage return lever 154. A coil spring 169 has one end connected to the rocker arm 166 and the other end connected to a lug 170 fixed to the end plate 19 of the carriage. Thus the spring 169 functions to yieldably retain the platen C in its forward or normal writing position as shown in Figure 5 and also to yieldably retain the carriage return lever 154 in its normal position as shown in Figure 1. The spring 169, after the carriage has been moved to the right and the carriage lever released, functions to automatically return the platen to its forward or writing position and to return the carriage return lever to its normal position. When the carriage return lever 154 is swung to the right the roller 167 will ride upwardly on the eccentric edge portion of the recess 160 of the cam plate 157 and thereby swing the lever 161 rearwardly. This rearward movement of the lever 161 causes the link 163 to be moved rearwardly and consequently the rock shaft 38 will be rotated in an anti-clockwise direction as viewed in Figure 5. At the time the carriage return lever 154 has been swung to the right a distance sufficient for the roller 167 to engage the concentric edge 159 of the cam face 157, the rollers 37 of the platen supporting frame will have been moved rearwardly by the springs 40 to the position shown in Figure 6 wherein said rollers 46 are at the engaging ends of the concentric surfaces 45 of the cam arms 43. Therefore upon further continued rearward movement of the carriage return lever 154 to the right the roller 167 will ride along the concentric edge 159 of the cam plate 157 and the rollers 46 of the carriage supporting frame will ride along the concentric edges 45 of the cam arms 43, and therefore this continued movement of the carriage return lever 154 will not effect a further rearward movement to the platen.

A spring latch 163$^a$ is pivoted on the link 163 for normally retaining the operating lever 144 against accidental displacement. This latch may be released manually when the parts are in normal position, and the latch will be rearwardly moved bodily by the link 163 when the carriage return lever 154 is operated and thereby automatically disconnected from the operating lever 144.

In order to effect a line spacing operation to the positive feed roll 61 immediately following the rearward bodily movement of the platen, there is provided a lever 171 which is pivoted on the screw 162 carried by the bracket 156. The lever 171 is provided with a forwardly extending arm 172 and the forward end of this arm is upturned as at 173 for engagement with a roller 174 journaled on the cam plate 157. The concentric edge portion 159 of the cam plate 157 is located between the eccentric edge portion 160 and the roller 174 and consequently the lever 161 is actuated prior to the actuation of the lever 171. The lever 171 is pivotally connected as at 175 to the front end of a rearwardly extending link 176 which is pivotally connected at its rear end as at 177 to the lever 128, as shown in Figure 16. Thus during the first part of the swinging movement of the carriage return lever 154, that is from the point $b$ to the point $c$ in Figure 38, the rearward movement of the platen C will be effected, and during further swinging movement of the carriage return lever 154 to the right, that is between the points $d$ and $f$, the line spacing movement to the positive feed roll 61 will be effected. Thus the platen C will be first moved rearwardly to relieve the tight contact relation between the platen and the work sheets, and immediately after the completion of this rearward movement of the platen the positive feed roll 61 will be given its line space movement whereby the work sheets will be line spaced.

In some conditions of work it may be desirable to effect a single line space movement to the work sheets whereas with other work it may be desirable to impart a double line space movement to said work sheets. I have therefore provided a means which may be adjusted to limit the line spacing movement of the feed rolls to a single space movement or which may be adjusted to permit a double line space movement to be imparted to the feed rolls. To this end there is mounted upon the bracket 156 a cover plate 178 having a depending rear flange 179 provided with an elongated opening or slot 180. Journaled in the bracket 156 and in the cover plate 178 is a vertically disposed oscillatory post 181 having an operating handle or finger piece 182 disposed above the cover plate 178 as shown in Figure 1. This post 181 is provided with a laterally extending stop pin 183 which projects outwardly through the slot or opening 180. A collar 184 is freely mounted on the pin 183 between the flange 179 of the cover plate and the post 181, and a coil spring 185 is disposed around the pin 183 between the collar 184 and the post. The post 181 may be oscillated to either of its extreme positions as shown in Figure 5 by the hand piece 182, and the spring 185 and the collar 184 will function to retain the post in either of its extreme positions When the stop pin 183 is in the full line position of Figure 25 a double space movement may be imparted to the feed roll 61, and when the pin is oscillated to the right as shown in dotted lines in Figure 25 a single space movement only can be imparted to said feed roll 61. The post 181 is provided with a recess 186, and a limiting plate 187 is pivotally connected to the carriage return lever 154 by a pin 188. This plate extends rearwardly from the pin 188 towards the post 181 and overlies the levers 161 and 171. The pin 168 on which the roller 167 is journaled is fixed to the lever 161 and projects upwardly into an angular slot 189 formed in the limiting plate 187. When the post 181 is in the full line position of Figure 25, the limiting plate will be moved rearwardly into the recess 186 of said post during movement of the carriage return lever to the right from the point $d$ to the point $f$, as shown in Fig. 38, and thereby effect a double line spacing movement to the feed rolls 61 and 62. When it is desired to limit the feeding movement of the rolls to a single line space, the post 181 is turned to the other extreme position as shown in dotted lines in Fig. 25, thus turning the recess 186 of said post out of the path of movement of the limiting plate 187. Consequently when the carriage return lever is swung to the right from the point $d$ to the point $e$, as shown in Fig. 38, a single line space movement only will be imparted to the feed rolls, and continued movement of the carriage return lever from the point $d$ to the point $f$ will be prevented by reason of the limiting plate 187 engaging the post 181 and thereby stopping further swinging movement of the carriage return lever to the right.

It will therefore be apparent that the platen remains in its extreme backward position during the time the carriage return lever is being moved to the right from the point $c$ to either of the point $e$ or $f$, and that the line spacing movements to the positive feed roll 61 begin after the platen has reached its extreme backward movement, and occur between the points $d$ and $e$, or between the points $d$ and $f$ depending upon whether a single line space movement or a double line space movement is being effected.

The invention also includes means for supporting and feeding a plurality of auxiliary ribbons 190 which are preferably in the form of narrow carbon strips, across the front of the platen in a direction transverse to the travel of the work sheets and interleaved therewith. These carbon strips are fed from the rear of the machine from a supply which is supported directly on the main frame of the machine, thence forwardly along the left side of the carriage, thence across the front of the machine where they are interleaved with the work sheets, and thence rearwardly along the right hand side of the carriage to a carbon strip feeding mechanism. Tensioning means is mounted on the left hand side of the carriage for gradually applying a tension to the carbon strips during feeding movement thereof and prior to the line spacing movement of the feed rolls, the maximum tension remaining constant during said line spacing movement. Thus during the swinging movement of the carriage return lever to the right, as illustrated in Figure 38, it will be apparent that the movement of the lever from the point $a$ to the point $b$ is an idle movement; that the movement of the lever from the point $b$ to the point $c$ causes the platen to begin its backward bodily movement, to begin the auxiliary ribbon tension movement, and to begin the auxiliary ribbon feed movement; that the lever during its movement from point $b$ to point $c$ causes the platen to be bodily moved to its extreme backward position; that when the lever reaches the point $c$ the platen has reached the extreme position of backward movement; that when the lever has reached the point $d$ the maximum tension on the auxiliary ribbons has been reached, the line spacing movement to the feed roll begins and the auxiliary ribbon feeding movement terminates; that when the lever has reached the point $e$ a single line space movement has been imparted to the feed rolls; that when the lever reaches the point $f$ a double line space movement has been imparted to the feed rolls; that the platen remains in its extreme backward position while the lever is moved from the point $c$ to the point $e$ or $f$, and that the maximum ribbon tension remains constant while the lever is being moved from the point $d$ to the point $e$ or $f$. It will, therefore, be seen that when the work sheets are line spaced the platen has been previously moved rearwardly so as to relieve the tight contact relation between the work sheets and the auxiliary ribbons or strips on the one hand and the platen on the other hand, and that the auxiliary ribbons or strips are under maximum tension whereby during the line spacing movement of the work sheets the auxiliary ribbons or strips will not be dragged upwardly therewith.

The paper carbon strips 190 are of relatively narrow width and are of indeterminate length. These strips are preferably arranged in spool form and the spools are mounted on a common spindle 191 which is fixed to the main frame A of the machine and extends rearwardly therefrom. Attached to the left hand end plate 19 of the carriage is a horizontally disposed channel shaped bracket 192 which extends fore and aft of the machine and includes a top wall 193, a bottom wall 194 and an inner vertical connecting wall 195. Attached to the bracket 192 and extending rearwardly therefrom is a secondary bracket 196 which includes a bottom 197, an outer vertical wall 198 and a rear end wall 199. Attached to the bottom 197 of the secondary bracket 196 is a plate 200 which is provided along its outer edge with a plurality of upstanding guide fingers 201 which are arranged in alinement one behind the other and in spaced relation to one another. The upper ends of the fingers 201 are provided with inwardly extending guard fingers 202 which are all arranged in a common horizontal plane. These guard fingers project rearwardly beyond their supporting guide fingers and the spaces between the guard fingers are restricted so as to permit the respective carbon strips of ribbons 190 being passed downwardly therebetween and into the spaces between the guide fingers 201. Preferably the rear end of each guide finger 201 is curved inwardly as at 203 to assist the carbon strips or ribbons 190 in making the necessary right angle turn, as shown in Figure 17. The guide fingers 201 are disposed in a plane parallel with and in spaced relation to the wall 198 of the secondary bracket 196 to provide sufficient room for the passage of the carbon strips or auxiliary ribbons 190. These carbon strips or ribbons 190 as they leave the guide fingers 201 are fed forwardly through the channel shaped bracket 192 and thence around a vertically disposed roller 204 which is journaled in the extreme front end of said bracket 192; thence horizontally in front of the platen C and in interleaved relation with the work sheets W to a vertical roller 205 which is journaled in a channel shaped bracket 206 fixed to the right hand end plate 20 of the carriage; and thence rearwardly within said bracket 206 to the rear end thereof where said ribbons are engaged by an intermittent feeding device 207.

As above explained it is desirable to apply a tension to the carbon strips 190 while said strips are being fed, and to retain the maximum tension on said carbon strips during line spacing movement of the feed rolls. To this end, I have provided an auxiliary tensioning device 208 which is located within the bracket 192 on the left hand side of the carriage between the ribbon guiding fingers 201 and the vertical roller 204. This tensioning device 208 includes a supporting plate 209 which is rigidly connected to the bracket 192 and extends outwardly therefrom. A post 210 is screwed into the plate 209 and secured thereto by a nut 211. The post 210 is disposed in spaced relation to the bracket 192, and a plurality of tension plates 212 of sheet metal are supported by the plate 209 between the bracket 192 and the post 210.

These tension plates 212 are provided with rectangular openings in their lower ends for receiving the supporting plate 209, and these openings are of sufficient sizes to permit the plates 212 to have free movement between the bracket 192 and the post 210. These tension plates 212 increase in height from the outermost plate to the innermost plate as shown particularly in Fig. 22, thereby permitting an operator to readily separate any one plate from the next adjacent plate for the purpose of inserting a carbon strip therebetween. The innermost or tallest plate is adapted to be supported by an arm or post 213 which is integral with or otherwise rigidly connected to the top 193 of the bracket 192. The upper end of the outermost or shortest plate 212 is provided with a guard 214 which overhangs the post 210 and functions to guard against any of the ribbons being inserted between the post and the outermost tension plate. Disposed within and extending longitudinally of the bracket 192 is a flat spring 215 and its front end is connected to the vertical wall 195 by means of a clamping bolt or the like 216. The spring 215 is bent outwardly and thence rearwardly to form a flat end portion 217 which registers with the tension plates 212 and the extreme or free end portion of the spring is formed into a slightly offset head 218. The spring 215 is so arranged that in its normal position it does not apply any tension to the carbon strips 190. In order to apply a gradually increased tension to the carbon strips, I have mounted a vertically disposed cam shaft 219 in the top and bottom walls 193 and 194 of the bracket 192. Fixed to the cam shaft 219 is a cam 220 which is adapted to engage the head 218 of the flat spring 215 and thereby apply tension to the carbon strips 190. In order to vary the amount of tension, I have provided the post 210 with a horizontally disposed threaded opening 221. An adjusting screw 222 is mounted within said opening and a coil spring 223 has one end mounted within the opening 221 and bearing against the screw 222, the other end of the spring bearing against the outermost tension plate 212. Thus when the cam 220 is oscillated to move the spring 215 outwardly, the amount of resistance may be varied by adjusting the screw 222 as may be readily understood. It is desirable to apply this tension to the carbon strips 190 during the feeding movement of said strips and to this end I have provided the cam shaft 219 with a rock arm 224 which is connected to the rear end of a forwardly extending coil spring 225. The forward end of the spring 225 is connected to the rear end of a forwardly extending link 226. The front end of the link 226 is disposed under the bracket 156 and carries a pin 227 which extends upwardly within a slot 228 formed in said bracket.

The pin 227 is pivotally connected to one arm 229 of a bell crank lever 230 which is pivoted to the screw 162. The other arm 231 of the bell crank lever is provided with a roller 232 which is adapted to engage an eccentric edge portion or seat 233 formed on the cam plate 157 and merging with the concentric portion 158 of said cam plate. Thus when the carriage return lever is being moved toward the right from the point $b$ in Figure 38 to the point $d$, the tension to the auxiliary ribbons or carbon strips will be gradually increased due to the cam 220 moving the free end of the flat spring 215 outwardly against the tension plates 212. As above explained this outward movement of the spring 215 may be variably opposed by the adjustment of the screw 222 so as to adjust the amount of tension imposed on said auxiliary ribbons or carbon strips 190. It will also be observed that when the carriage return lever 154 is being moved from the point $b$ to the point $d$ the roller 232 is being moved upwardly along the eccentric edge portion or seat 233 of the hand lever, and as the lever approaches the point $d$ the roller begins to ride along the concentric edge portion 158, thus maintaining the maximum tension on the auxiliary ribbons or carbon strips during the balance of the swinging movement of the carriage return lever to the right.

In order to impart a feeding movement to the carbon strips prior to the line spacing movement of the feed roller 61 but simultaneously with the application of the tensioning device 208, I have provided the intermittent ribbon feeding means 207. This ribbon feeding means is mounted at the rear end of the bracket 206 which as above stated extends along the right hand side of the carriage. The bracket 206 includes a bottom 234, a top 235 and an inner connecting wall 236 thereby forming an outwardly opening channel shaped bracket. The guide roll 205 is located at the front end of the bracket 206 and is disposed between the bottom 234 and the top 235, the roll being journaled on a vertically disposed pin 237 fixed to said bottom 234 and top 235. Located at the rear end of the bracket 206 is a positive feed roll 238 which is formed with a series of corrugations 239 on its periphery. This roll 238 is located between the bottom 234 and top 235 of the bracket and is provided with integral upper and lower bearing pins 240 and 241, the former being journaled in the top 235 and the latter being journaled in the bottom 234. Fixed to the lower bearing pin 241 is a ratchet wheel 242. A lever 243 is fulcrumed at its angle on the lower bearing pin 241 and carried by one arm 244 of said lever is a spring pawl 245 which yieldably engages the teeth on the ratchet wheel 242. A spring back dog 246 is mounted on the bracket 206 and cooperates with the teeth of the ratchet wheel 242 to prevent backward rotation thereof. Fixed to the rock shaft 38 near the right hand end thereof is a rock arm 247 having an elongated slot 248 formed therein. A roller 249 is mounted on a pin 250 which is adapted to be clamped in any adjusted position along the slot 248. A bell crank lever 251 is provided with arms 252 and 253 which are connected by a saddle-like angle portion 254. The arm 252 is disposed inside the end plate 20 of the carriage and directly below the roller 249, whereas the arm 253 is disposed on the outside of the end plate 20. This lever 251 is fulcrumed to the end plate 20 through the medium of a pivot screw 255. The arm 252 normally extends upwardly toward the roller 249 and its upward movement is limited by a stop lug 256 which is adapted to engage the upper edge of the plate 20. A coil spring 257 surrounds the pivot pin 255 and has its ends operatively connected to the end plate 20 of the carriage and to the lever 251 so as to urge the lever in a direction whereby the stop 256 will engage the upper edge of said end plate 20. The upper end of the arm 252 of the lever 251 is disposed under the roller 249 and is normally located in spaced relation thereto. A link 258 is connected at its forward end to the arm 253 of the lever 251 and at its other end to the arm 259 of the lever 243. It will, therefore, be apparent that when the rock shaft 38 is rocked in an anti-clockwise direction as viewed in Figure 10 the roller 249 will be moved downwardly and will engage the arm 252 of the bell crank lever 251 and oscillate the same against the tension of the spring 257. This movement of the bell crank lever 251 causes the arm 253 thereof to swing forwardly and thereby move the link 258 and afford a rocking movement of the pawl carrying lever 243. Thus a feed movement is imparted to the corrugated feed roll 238. Cooperating with the positively actuated corrugated feed roller 238 is a corresponding idle feed roll 260 having corrugations 261 in its periphery which correspond to and are adapted to mesh with the corrugations 239 of the positive feed roll 238. The idle feed roll 260 is provided with upper and lower bearing pins 262 and 263. A substantially U-shaped frame 264 embraces the rear end of the bracket 208 and this frame includes a bottom 265, an outer end wall 266, an inner end wall 267, a top section 268 which extends outwardly from the inner wall, and a top section 269 which extends inwardly from the outer wall. The bearing pins 262 and 263 of the idle roll 260 are journaled in suitable openings formed in the bottom 265 and top section 269. The lower bearing pin 263 passes downwardly through a transverse slot 270 formed in the bottom 234 of the bracket 208, and the bearing pin 241 of the positive feed roll 238 passes through a transverse slot 271 formed in the bottom 265 of the frame 264. By means of the pins 241 and 263 of the feed rolls passing downwardly through the transverse slots 270 and 271, the frame 264 is capable of being bodily moved in a plane transverse to the longitudinal axis of the bracket 206 and thereby permit the idle roll 260 to be moved into and out of engagement with the positive feed roll 238. The idle roll 260 is yieldably held in operative engagement with the positive feed roll 238 by means of a coil spring 272 which is disposed between the left hand end wall 267 of the frame 264 and a boxing 273 which is attached to the vertical wall 236 of the bracket 206. The boxing 273 includes a vertical wall 274 which is spaced from the vertical wall 236. A cam shaft 275 is disposed within the boxing 273 and has its upper and lower ends respectively journaled in the top 268 and bottom 265 of the transversely movable frame 264. This shaft 275 is provided with a recess 276 which extends for the full distance between the bottom 265 at the top 268 of said frame 264. The cam shaft 275 is provided with an operating handle 277. Thus in the normal position of the feed rolls the carbon strips 190 are disposed therebetween and securely clamped by the interfitting corrugations of said rolls, as shown particularly in Fig. 17. When, however, it is desired to move the idle roll 260 out of operative engagement with the positive roll 238, the cam shaft 275 is turned by the operating handle 277 to the position shown in Figure 19, which, by reason of the shaft being journaled in the frame 264, causes said frame to be moved toward the right as shown in Figure 19, thereby operating the feed rolls. After the carbon strips 190 have been positioned between the rolls, the operator swings the cam shaft 275 to the position shown in Figure 17, and the recess 276 permits the crank shaft together with the frame 264 to be bodily moved to the left under the influence of the spring 272. In order to prevent the carbon strips 190 from being carried around the positive feed roll 238, I have provided a guard finger 278 as shown in Figure 19.

Inasmuch as the positive feed roll 61 for the work sheets is intermittently rotated through the medium of a ratchet mechanism, it is desirable to provide means for positively locking said roll against backward movement immediately following the forward movement of the roll. To this end, I have provided a lock lever 279 as shown particularly in Figure 10. This lever is pivoted as at 280 to the end plate 20ª of the carriage. Fixed to the forward end of the lever 279 is a toothed element 281 which is adapted to engage the teeth of the gear wheel 91 which is fixed to rotate with said feed roll 61. The rear end of the lock lever 279 extends downwardly under the saddle-like connecting portion 254 of the bell crank lever 261 and the extreme rear end 282 is disposed in advance of a pin 283 fixed to the arm 253 of the bell crank lever 251. Thus upon oscillation of the bell crank lever 251 upon rocking movement of the rock shaft 38, the pin 283 will engage the end 282 of the lever 279 and thereby rock the latter and elevate the toothed element 281 and thereby disconnect the same from the gear 91. A spring 284 surrounds the pivot 280 of the lock lever and functions to yieldably retain the toothed element 281 in engagement with the gear 91. It will, therefore, be apparent that whenever the carriage return lever 154 is actuated to effect a line spacing movement to the positive feed roll 61, the lock lever 279 will be disengaged from the gear wheel 91, and immediately upon release of the carriage return lever the spring 284 will return the lock lever 279 to its normal or locking position with respect to the gear 91 and thereby retain the positive feed roll 61 against accidental backward rotation.

I have also provided a bracket at the rear end of the main frame A of the machine whereby the machine may be tilted upwardly and supported by the bracket in an upwardly and rearwardly inclined relation. The bracket is connected to the main frame in a manner which will prevent injury to the carbon strip spools. This supporting bracket or frame includes at each side of the back wall 7 of the machine frame A an upwardly and rearwardly extending arm 285 and a downwardly and rearwardly extending arm 286, the former being secured to the base of the main frame and the latter being secured to the top of the main frame. The rear ends of the arms 285 and 286 are connected by a screw 287. A supplemental arm 288 is connected to the upper arm 286 and extends upwardly and rearwardly, thence downwardly as at 289, thence forwardly as at 290, and thence downwardly as at 291, the lower end being secured to the arms 285 and 286 by the screws 287. The arms 285, 286 and 288 constitute a side support and this support is duplicated adjacent the other side of the machine so as to position the ribbon spools therebetween. The portions 289 of the arms 288 are located in rear of the ribbon spools, and attached to these portions 289 by screws 292 is a transversely disposed foot piece 293. Also secured by the two screws 287 is a transversely disposed rod 294. The plane containing the foot piece 293 and the rod 294 is inclined rearwardly so as to form an obtuse angle with respect to the base of the machine frame A. Thus when it is desired to swing the machine upwardly, the operator raises the front end of the machine which lowers the rod 294 onto the support and upon further upward movement of the front end of the machine, said machine is rocked upon the roller 294 until the foot piece 293 also engages the support. In this position the machine will remain at rest for the purpose of permitting access to the parts or for any other purpose desired.

Under some circumstances it may be desirable to move the work sheets either backwardly or forwardly independently of the line spacing mechanism for the purpose of adjusting the writing line on the work sheets relative to the printing line of the platen. To this end a vertically disposed stop pin 295 is vertically movable in an opening formed in the cover plate 178. This pin is provided on its upper end with a head 296 and on its lower end with a stop 297. A coil spring 298 is disposed between the head 296 and the cover plate 178 and tends to normally urge the stop pin 295 upwardly so as to dispose the lower stop 297 above the carriage return lever 154. When, however, it is desired to move the work sheets either forwardly or backwardly independently of the line spacing mechanism, the carriage return lever 154 is moved forwardly to the right until the lever is on the right hand side of the stop pin 295. The pin 295 is then depressed and while held in its depressed position the carriage return lever 154 is released, the lower stop 297 engaging under the carriage return lever and thereby retaining the stop pin 295 against upward movement. Thus the carriage return lever has been moved to a position whereby the auxiliary ribbons or carbon strips have been tensioned and fed and are held under tension so as to permit the work sheets to be moved backwardly or forwardly without dragging the carbon strips therewith. From the foregoing, it will be observed that the platen and the work sheets are normally disposed in relatively tight contact whereby clear type impressions will be produced; that when the platen is moved rearwardly said relatively tight contact relation is relieved and the interleaved carbon strips are fed, and that the work sheets are line spaced after the feeding of the carbon strips and while the relatively tight contact between the platen and the sheets is relieved whereby the line spacing movement of the work sheets will not drag the carbon strips upwardly therewith.

In loading the machine the lead-in ends of the work sheets W are drawn over the table X and thence downwardly under the lower guide roll 60, and thence upwardly past the platen C. The free ends of the carbon strips 190 are then respectively positioned between the guide fingers 201 on the bracket 196, and these strips are then led forwardly and respectively positioned between the tension plate 212 of the tension device 208. The free ends of the carbon strips are then led forwardly around the vertical roller 204 and thence to the right hand side of the machine, the carbon strips being interleaved with the free or lead-in portions of the work sheets W. The free ends of the carbon strips are then trained around the vertical roller 205 and are thence moved rearwardly to the strip feeding means 207. The operating lever 277 is oscillated so as to separate the two corrugated feed rolls 238 and 260, and the free ends of the carbon strips are then placed between said feed rolls. The operating lever 277 is then released so as to cause the corrugated roll 260 to be moved by the spring 272 into operative or feeding relation with the corrugated roll 238. In order to position the lead-in ends of the work sheets W between the feed rolls 61 and 62, the latch 163$^a$ is moved rearwardly and the operating lever 144 is swung forwardly to relieve the yieldable contact relation between the two rolls 61 and 62. The frame 130 is then swung upwardly carrying with it the front or idle roll 62. After the lead-in ends of the work sheets W have been positioned in front of the intermittent feed roll 61 the frame 130 is returned to its operative position whereby the work sheets are yieldably clamped between the feed rolls 61 and 62. In this position of the parts the lead-in ends of the work sheets are disposed between the knife 132 and the positive feed roll 61. The operator then pulls the work sheets W forwardly until a pair of the printed marks 88 on the front or original work sheet 85 registers with the straight cutting edge 132$^b$ of the knife. The operating lever 144 is then returned to its position under the latch 163$^a$ thereby effecting a yieldable although comparatively tight contact relation between the feed rolls 61 and 62 and the lead-in ends of the work sheets. The free end portions of the work sheets above the knife 132 are then swung forwardly under said knife and while held in this position the operator withdraws the cutting element 147 from its holding spring 153 and moves this cutting element along the knife 132 and with sufficient downward pressure on the element to effect a severing of the free ends of the work sheets. The line spacing lever 154 is then swung to the right as often as is necessary to feed the work sheets forwardly to a distance suitable to begin the writing of a letter. After the first line has been written the operator swings the carriage return lever 154 to its extreme right hand position, from the point $a$ to the point $f$ in Figure 38, after which continued pressure in the same direction by the operator on the carriage return lever, the carriage will be returned to its proper writing position. During the movement of the carriage return lever 154 from the point $a$ to the point $b$ none of the mechanisms heretofore described will be actuated for the reason that this is a loose movement of the lever. During movement of the carriage return lever from the point $b$ to the point $c$, the rock shaft 38 will be oscillated in an anticlockwise direction from the position shown in Figure 5 to the position shown in Figure 6, thereby swinging the cam arm 43 rearwardly and permitting the springs 40 to move the platen supporting links 31 rearwardly and thereby bodily moving the platen C rearwardly to relieve the tight contact relation between the platen and the work sheets. The carriage return lever 154 during its movement from the point $b$ to the point $d$ effects a gradual application of the tension device 208 on the carbon strips 190 and also actuates the carbon strip feeding mechanism 207. When the carriage return lever 154 reaches the point $d$, a carbon strip feeding movement has been completed. The platen is retained in its backward position during movement of the carriage return lever 154 from the point $c$ to the point $e$ or $f$ depending upon whether a single or double line space movement is imparted to the feed mechanism. The maximum carbon strip tension remains constant while the carriage return lever is being moved from the point $d$ to the point $e$ or $f$. The carriage return lever when moving from the point $d$ to the point $e$ effects a single line space movement to the feed rolls, or this lever when moving from the point $d$ to the point $f$ effects a double line spacing movement to said feed rolls. When it is desired to effect a single line spacing movement to the feed rolls the control rock shaft 181 is moved to the dotted line position shown in Figures 25 and 26. When, however, a double line space movement is desired to be imparted to the feed rolls the control rock shaft 181 is turned to the full line position shown in Figures 25 and 26. Under some circumstances it may be desired to feed the carbon strips 190 without imparting a line spacing movement to the work sheets W and to this end the operator presses the finger piece 121 to the left to disconnect the clutch teeth 114 and 117 and thereby disconnect the line spacing mechanism from the feed rolls 61. The operator with her right hand holds the finger piece 121 in its extreme position of movement so as to retain the clutch teeth 114 and 117 out of engagement while the operator with her left hand moves the carriage return lever from the point $a$ to the point $d$ to thereby effect a feeding movement to the carbon strips without imparting a feeding movement to the work sheets. If it is found desirable to adjust the work sheets either forwardly or backwardly relative to the platen, the operator moves the carriage return lever to the right until the latter has passed the stop pin 295. Then while holding the carriage return lever in this position the stop pin is pushed downwardly until the lower stop 297 is below the lever. The operator holds the pin in this down position and then releases the carriage return lever which automatically swings toward the left and engages the shank of the stop pin above the lower stop 297. In this position of the parts the carbon strips are retained under maximum tension and consequently the work sheets will be moved forwardly or backwardly without dragging said strips therewith.

I claim:—

1. In a manifolding device; a carriage; a carriage return lever having a cam a platen mounted on the carriage and past which work sheets are moved; two cooperating sheet feeding rolls disposed above the platen and between which the work sheets are fed after leaving the platen; a plurality of carbon strips interleaved with the work sheets and extending transversely thereof in front of the platen; and separate means operated by the cam of the carriage return lever for rotating the sheet feeding rolls to effect a line spacing movement to the work sheets, and for feeding the carbon strips in advance of the line spacing movement of the sheet feeding rolls.

2. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; a normally ineffective tension device for the carbon strips; normally inactive feed rolls for the carbon strips; and cam-actuating means for rotating the feed rolls to effect a line spacing movement to the work sheets, and for simultaneously rendering the strip tension device effective and for actuating the strip feed rolls prior to the line spacing movement of the sheet feeding rolls.

3. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; a normally ineffective tension device for the carbon strips located at one side of the work sheets; a normally inactive feeding means for the carbon strips located at the other side of the work sheets; and cam-actuating means for first rendering the tension device effective and for simultaneously operating the carbon strip feeding means, and for subsequently rotating the feed rolls to effect a line spacing movement to the work sheets while said tension device remains effective.

4. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; a normally ineffective tension device for the carbon strips located at one side of the work sheets; a normally inactive feeding means for the carbon strips located at the other side of the work sheets; and means including a single operating lever for first rendering the tension device effective and for simultaneously operating the carbon strip feeding means, and for subsequently rotating the feed rolls to effect a line spacing movement to the work sheets while said tension device remains effective.

5. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; and means including a single operating lever for rotating the sheet feeding rolls to effect a line spacing movement to the work sheets, and for feeding the carbon strips in advance of the line spacing movement of the sheet feeding rolls; and means for variably limiting the line spacing movement of the sheet feeding rolls comprising a vertically disposed rock shaft having a recess formed therein, a limiting plate carried by the lever for cooperation with the rock shaft, and means for turning the rock shaft to either of two extreme positions for permitting the recess to receive the limiting plate and to prevent the recess from receiving the limiting plate respectively.

6. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; a normally ineffective tension device for the carbon strips located at one side of the work sheets, a normally inactive feeding means for the carbon strips located at the other side of the work sheets comprising a pair of intermeshing corrugated feed rolls between which the carbon strips are positioned and correspondingly corrugated by said rolls; and cam-actuating means for first rendering the tensioning device effective and for simultaneously rotating the corrugated rolls to feed the strips through the tensioning device, and for subsequently rotating the sheet feeding rolls to effect a line spacing movement to the work sheets while said tension device remains effective.

7. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; and operating means for first feeding the carbon strips and simultaneously moving the platen rearwardly in a direction away from the work sheets and the carbon strips, and for subsequently effecting a line spacing movement to the sheet feeding rolls while the platen is retained in its rearwardly moved position.

8. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; and operating means including a single operating lever for first feeding the carbon strips and simultaneously moving the platen rearwardly in a direction away from the work sheets and the carbon strips, and for subsequently effecting a line spacing movement to the sheet feeding rolls while the platen is retained in its rearwardly moved position.

9. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; and operating means including a single operating lever for first feeding the carbon strips and simultaneously moving the platen rearwardly in a direction away from the work sheets and the carbon strips, and for subsequently effecting a line spacing movement to the sheet feeding rolls while the platen is retained in its rearwardly moved position, said operating means including a rock shaft actuated by the operating lever and separate connections between the rock shaft and the platen and between the rock shaft and the carbon strip feeding means.

10. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; and operating means including a single operating lever for first feeding the carbon strips and simultaneously moving the platen rearwardly in a direction away from the work sheets and the carbon strips, and for subsequently effecting a line spacing movement to the sheet feeding rolls while the platen is retained in its rearwardly moved position, said operating means including a rock shaft actuated by the operating lever and separate connections between the rock shaft and the platen and between the rock shaft and the carbon strip feeding means; and means for automatically returning the operating means to normal position upon release of the operating lever.

11. In a manifolding device; the combination with a typewriter including a main frame and a carriage having a platen; of means for guiding work sheets past the platen; a carbon strip spool located in rear of the main frame and rotatably supported thereby, the carbon strip extending forwardly from the spool and being interleaved with the work sheets; and a bracket structure attached to the machine frame for supporting the latter on end, said structure surrounding the carbon strip spool and protecting the same.

12. In a manifolding device; the combination with a typewriter including a main frame and a carriage having a platen; of means for guiding work sheets past the platen; a carbon strip spool located in rear of the main frame and rotatably supported thereby, the carbon strip extending forwardly from the spool and being interleaved with the work sheets; and a bracket structure attached to the machine frame for supporting the latter on end, said structure surrounding the carbon strip spool and protecting the same and including a transversely extending foot piece and a transversely extending rod disposed in rear of the spool, the rod being disposed below and in spaced relation to the foot piece.

13. In a manifolding device; the combination with a typewriter including a main frame and a carriage having a platen; of means for guiding work sheets past the platen; a carbon strip spool located in rear of the main frame and rotatably supported thereby, the carbon strip extending forwardly from the spool and being interleaved with the work sheets; and a bracket structure attached to the machine frame for supporting the latter on end, said structure surrounding the carbon strip spool and protecting the same and including a transversely extending foot piece and a transversely extending rod disposed in rear of the spool, the foot piece and rod being disposed in a plane extending upwardly and rearwardly from the plane containing the base of the frame.

14. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; a feeding means common to all of the carbon strips and located at one side of the machine; a normally ineffective tension device for the carbon strips located at the other side of the machine; and means located at one side of the machine for first rendering the tension device effective and for simultaneously operating the carbon strip feeding means, and for subsequently rotating the feed rolls to effect a line spacing movement to the work sheets while said tension device remains effective.

15. In a manifolding device; a platen past which work sheets are moved; two cooperating sheet feeding rolls disposed above the platen and between which the work sheets are fed after leaving the platen; a plurality of carbon strips interleaved with the work sheets and extending transversely thereof in front of the platen; a feeding means common to all of the carbon strips and located at one side of the machine; a normally ineffective tension device for the carbon strips located at the other side of the machine; and means including a single manually operable lever located at one side of the machine for first rendering the tension device effective and for simultaneously operating the carbon strip feeding means, and for subsequently rotating the feed rolls to effect a line spacing movement to the work sheets while said tension device remains effective.

16. A manifolding device comprising in combination a typewriting machine including a main frame and a traveling carriage mounted thereon; a non-feeding platen mounted on the carriage; a guide mounted on the carriage below the platen for guiding work sheets upwardly past the platen; two cooperating feed rolls supported on the carriage above the platen for feeding the work sheets past the platen; a plurality of spools of carbon strips located in rear of the machine frame and rotatably supported directly thereon, the strips extending forwardly along one side of the carriage, thence across the carriage in interleaved relation with the work sheets, and thence rearwardly along the other side of the carriage; a feeding means located on the last mentioned side of the carriage; and means for rotating the feed rolls to effect a line spacing movement to the work sheets and for operating the strip feeding means.

17. A manifolding device comprising in combination a typewriting machine including a main frame and a traveling carriage mounted thereon; a non-feeding platen mounted on the carriage for backward and forward bodily movements; a guide mounted on the carriage below the platen for guiding work sheets upwardly past the platen; two cooperating feed rolls supported on the carriage above the platen for feeding the work sheets past the platen; a plurality of spools of carbon strips located in rear of the machine frame and rotatably supported directly thereon, the strips extending forwardly along one side of the carriage, thence across the carriage in interleaved relation with the work sheets, and thence rearwardly along the other side of the carriage; a feeding means located on the last mentioned side of the carriage; and means for first moving the platen backwardly and operating the strip feeding means, and for subsequently rotating the feed rolls to effect a line spacing movement to the work sheets.

18. A manifolding device comprising in combination a typewriting machine including a main frame and a traveling carriage mounted thereon; a non-feeding platen mounted on the carriage; a guide mounted on the carriage below the platen for guiding work sheets upwardly past the platen; two cooperating feed rolls supported on the carriage above the platen for feeding the work sheets past the platen; a plurality of spools of carbon strips located in rear of the machine frame and rotatably supported directly thereon, the strips extending forwardly along one side of the carriage, thence across the carriage in interleaved relation with the work sheets, and thence rearwardly along the other side of the carriage; a feeding means located on the last mentioned side of the carriage; a tension device for the carbon strips mounted on the carriage between the spools and the work sheets; and means for first moving the platen backwardly and simultaneously operating the tension device and the strip feeding means, and for subsequently rotating the feed rolls to effect a line spacing movement to the work sheets.

19. In a manifolding device; a platen past which work sheets are moved; a guide for the sheets disposed below the platen; a pair of feed rolls disposed above the platen for feeding the sheets past the platen; means for supporting the platen for backward and forward bodily movements, the front printing face of the platen being normally disposed in front of a substantially vertical plane tangent to the front lines of the guide and one of the feed rolls; carbon strips interleaved with the work sheets; and means for first moving the platen backwardly until the printing face thereof is substantially located in said vertical plane and for subsequently rotating the feed rolls to effect a line spacing movement to the work sheets.

20. In a manifolding device; a platen past which work sheets are moved; a guide for the sheets disposed below the platen; a pair of feed rolls disposed above the platen for feeding the sheets past the platen; means for supporting the platen for backward and forward bodily movements, the front printing face of the platen being normally disposed in front of a substantially vertical plane tangent to the front lines of the guide and one of the feed rolls, carbon strips interleaved with the work sheets; a carbon strip tension device located at one side of the work sheets; a carbon strip feeding means located at the other side of the work sheets; and means for first moving the platen backwardly until the printing face thereof is substantially located in said vertical plane and for simultaneously operating the carbon strip tension device and the carbon strip feeding means, and for subsequently rotating the feed rolls to effect a line spacing movement to the work sheets.

21. In a manifolding device, a platen element past which work sheets are fed and which sheets tightly and compactly engage said platen element prior to and during each printing operation; of a guide element for the work sheets disposed below the platen element; a sheet feeding element comprising two cooperating feed rolls disposed above the platen element and between which the work sheets are fed after leaving the platen element; a carbon strip interleaved with the work sheets; strip feeding means; and means including a single manually operable lever for first bodily moving one of the elements to relieve the normal tight contact relation between the work sheets and the platen element, for then operating the strip feeding means while said tight contact relation is relieved, and for then actuating the feed rolls to effect a line space movement to the work sheets while said tight contact relation is relieved.

22. In a manifolding device, a platen past which work sheets are fed and which sheets tightly and compactly engage said platen prior to and during each printing operation; of a guide for the work sheets disposed below the platen; a sheet feeding means comprising two cooperating feed rolls disposed above the platen and between which the work sheets are fed after leaving the platen; a carbon strip interleaved with the work sheets; strip feeding means; and means including a single manually operable lever for first bodily moving the platen to relieve the normal tight contact relation between the work sheets and the platen, for then operating the strip feeding means while said tight contact relation is relieved, and for then actuating the feed rolls to effect a line space movement to the work sheets while said tight contact relation is relieved.

In testimony whereof, I have hereunto subscribed my name.

GUSTAVE O. DEGENER.